(12) United States Patent
Matsunaga

(10) Patent No.: US 8,849,021 B2
(45) Date of Patent: Sep. 30, 2014

(54) IMAGE PROCESSING APPARATUS, METHOD, AND STORAGE MEDIUM FOR HIGH SPEED COMPRESSION PROCESSING

(75) Inventor: Daisuke Matsunaga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 13/177,464

(22) Filed: Jul. 6, 2011

(65) Prior Publication Data
US 2012/0014597 A1 Jan. 19, 2012

(30) Foreign Application Priority Data

Jul. 13, 2010 (JP) ................................. 2010-159164

(51) Int. Cl.
G06K 9/36 (2006.01)
H04N 7/12 (2006.01)
H04N 11/02 (2006.01)
H04N 11/04 (2006.01)
H04N 1/64 (2006.01)

(52) U.S. Cl.
CPC ...................................... *H04N 1/644* (2013.01)
USPC ......................................... 382/166; 348/420.1

(58) Field of Classification Search
CPC ......... H04N 1/644; H04N 1/648; H04N 7/28; H04N 19/00963
USPC ...................... 382/166, 253; 348/422.1, 420.1
See application file for complete search history.

(56) References Cited

U.S. PATENT DOCUMENTS

| 5,625,759 | A | 4/1997 | Freeman | 395/114 |
|---|---|---|---|---|
| 6,243,416 | B1 | 6/2001 | Matsushiro et al. | 375/240 |
| 6,373,890 | B1 | 4/2002 | Freeman | 375/240 |
| 6,658,156 | B1 | 12/2003 | Aritomi | 382/239 |
| 6,750,867 | B1 | 6/2004 | Gibson | 345/501 |
| 7,085,006 | B2 * | 8/2006 | Yokoyama et al. | 358/1.9 |
| 7,236,636 | B2 | 6/2007 | Sakai et al. | 382/238 |
| 7,652,800 | B2 | 1/2010 | Shoda et al. | 358/451 |
| 8,331,705 | B2 | 12/2012 | Shiraishi et al. | 382/238 |

(Continued)

FOREIGN PATENT DOCUMENTS

| JP | 10-257488 | 9/1998 |
|---|---|---|
| JP | 2004-104621 | 4/2004 |

(Continued)

OTHER PUBLICATIONS

U.S. Appl. No. 13/255,238 filed Sep. 7, 2011. Applicant: Hirokazu Tamura.

(Continued)

*Primary Examiner* — Yubin Hung
(74) *Attorney, Agent, or Firm* — Fitzpatrick, Cella, Harper & Scinto

(57) ABSTRACT

Image data is divided into blocks, each block has M×N pixels, the number of colors of each block undergoes reduction from M×N to each number of one to (M×N−1). Differences are acquired between pixel values for each block after color reduction, and pixel values for each block before first color reduction. A first table in which thresholds are associated with either the amount of data to be reduced or the amount of data to be remained, is acquired based on the acquired difference. A threshold at which the amount of data after compression drops to or below a target data amount is specified, based on the first table, and compressed data is generated based on image data after second color reduction using the specified threshold.

11 Claims, 18 Drawing Sheets

(56) References Cited

U.S. PATENT DOCUMENTS

| | | | |
|---|---|---|---|
| 8,452,085 B2 | 5/2013 | Itoh | 382/163 |
| 2001/0053249 A1* | 12/2001 | Krishnamachari | 382/165 |
| 2002/0047850 A1* | 4/2002 | Yoshioka | 345/600 |
| 2003/0161541 A1* | 8/2003 | Ridge | 382/245 |
| 2005/0069124 A1 | 3/2005 | Hayashi | 382/251 |
| 2005/0069214 A1 | 3/2005 | Hayashi | 382/251 |
| 2005/0237951 A1* | 10/2005 | Yang et al. | 370/256 |
| 2006/0023960 A1* | 2/2006 | Eschbach et al. | 382/239 |
| 2008/0100624 A1 | 5/2008 | Matsunaga | |
| 2008/0259359 A1 | 10/2008 | Tamura | 358/1.1 |
| 2008/0273212 A1 | 11/2008 | Takeishi | 358/1.9 |
| 2009/0097072 A1 | 4/2009 | Tamura | 358/3.01 |
| 2009/0110320 A1* | 4/2009 | Campbell et al. | 382/260 |
| 2009/0323132 A1 | 12/2009 | Yano et al. | 358/466 |
| 2010/0067790 A1 | 3/2010 | Yamamoto | 382/166 |
| 2010/0124380 A1* | 5/2010 | Shiraishi et al. | 382/239 |
| 2010/0128295 A1 | 5/2010 | Tamura | 358/1.12 |
| 2010/0172583 A1 | 7/2010 | Shimauchi et al. | 382/166 |
| 2011/0064320 A1 | 3/2011 | Ikuno | 382/232 |
| 2011/0109942 A1 | 5/2011 | Kashibuchi et al. | 358/3.13 |
| 2011/0188750 A1 | 8/2011 | Tamura | 382/167 |
| 2011/0222082 A1 | 9/2011 | Tomi | 358/1.9 |
| 2012/0050763 A1 | 3/2012 | Takeishi | 358/1.9 |

FOREIGN PATENT DOCUMENTS

| | | |
|---|---|---|
| JP | 2008-271046 | 11/2008 |
| JP | 2010-074406 | 4/2010 |
| JP | 2011-071767 | 4/2011 |
| WO | 2011/125433 | 1/2011 |

OTHER PUBLICATIONS

U.S. Appl. No. 13/197,643, filed Aug. 3, 2011.
U.S Appl. No. 13/255,238, filed Sep. 7, 2011.
U.S. Appl. No. 13/197,643, filed on Aug. 3, 2011, Inventors: Takeishi et al.

* cited by examiner

FIG. 3

IMAGE

| | |
|---|---|
| | ALL PIXELS SAME COLOR: 1 PATTERN |
| | TWO COLORS: 7 PATTERNS |
| | THREE COLORS: 6 PATTERNS |
| | ALL PIXELS DIFFERENT COLORS: 1 PATTERN |

FIG. 4
| IMAGE | PATTERN FLAG |
|---|---|
|  | 0 |
|  | 1 |
|  | 2 |
|  | 3 |
|  | 4 |
|  | 5 |
|  | 6 |
|  | 7 |
|  | 8 |
|  | 9 |
|  | A |
|  | B |
|  | C |
|  | D |
|  | E |

FIG. 15
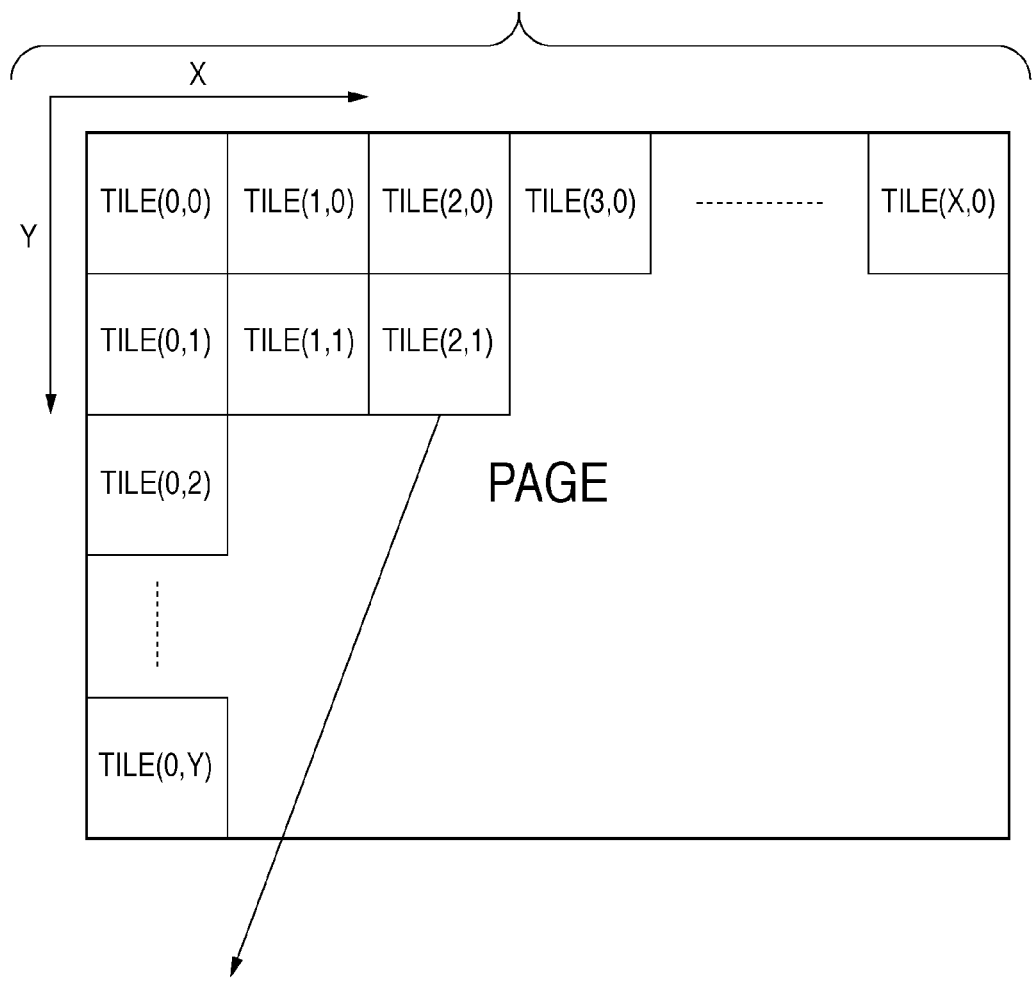
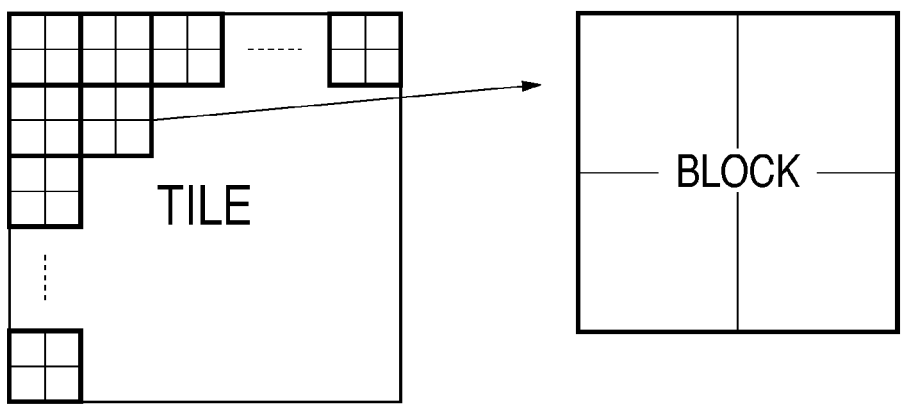

F I G. 16
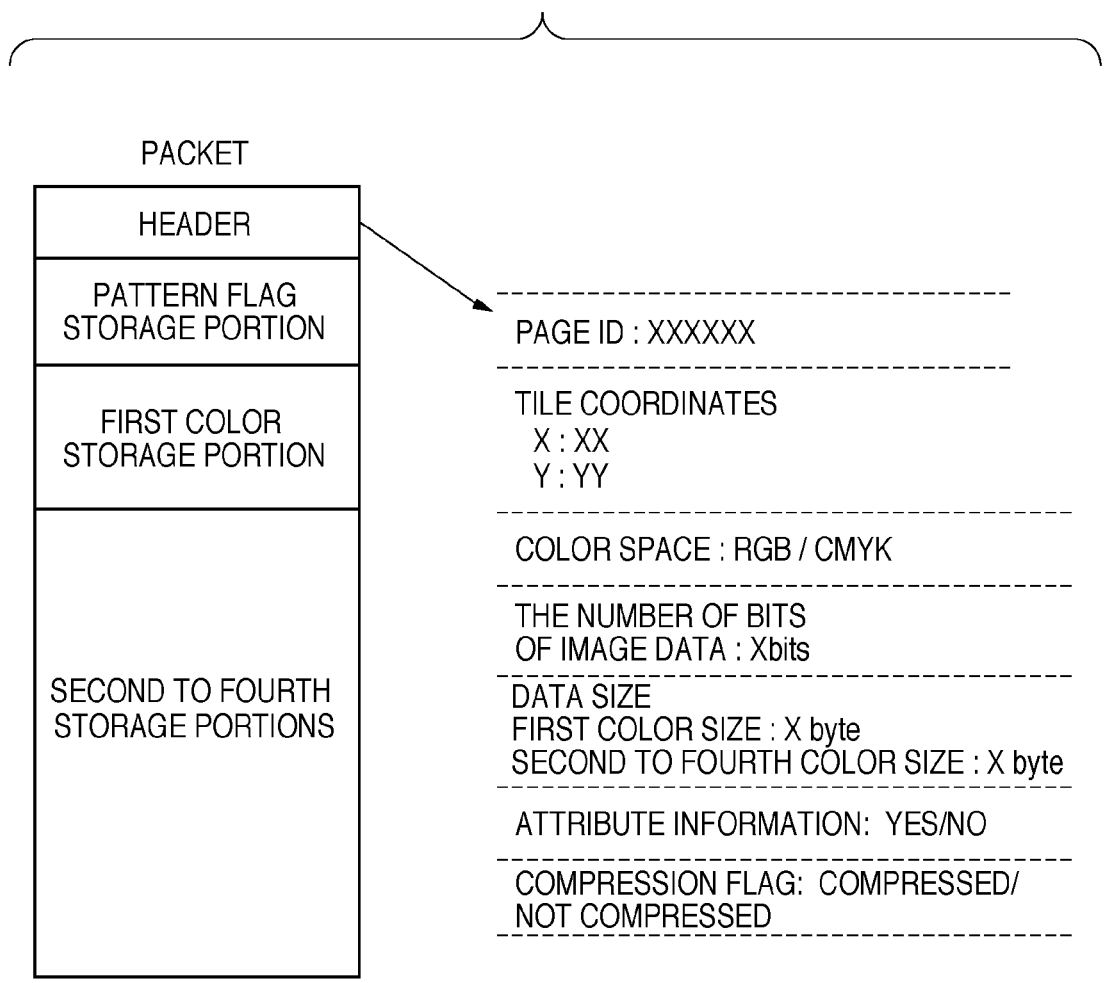

| COORDINATE (X, Y) | PACKET SIZE (Bytes) |
|---|---|
| (0, 0) | 32 |
| (1, 0) | 48 |
| (2, 0) | 36 |
| (3, 0) | 128 |
| ⋮ | ⋮ |
| (X, Y) | 36 |

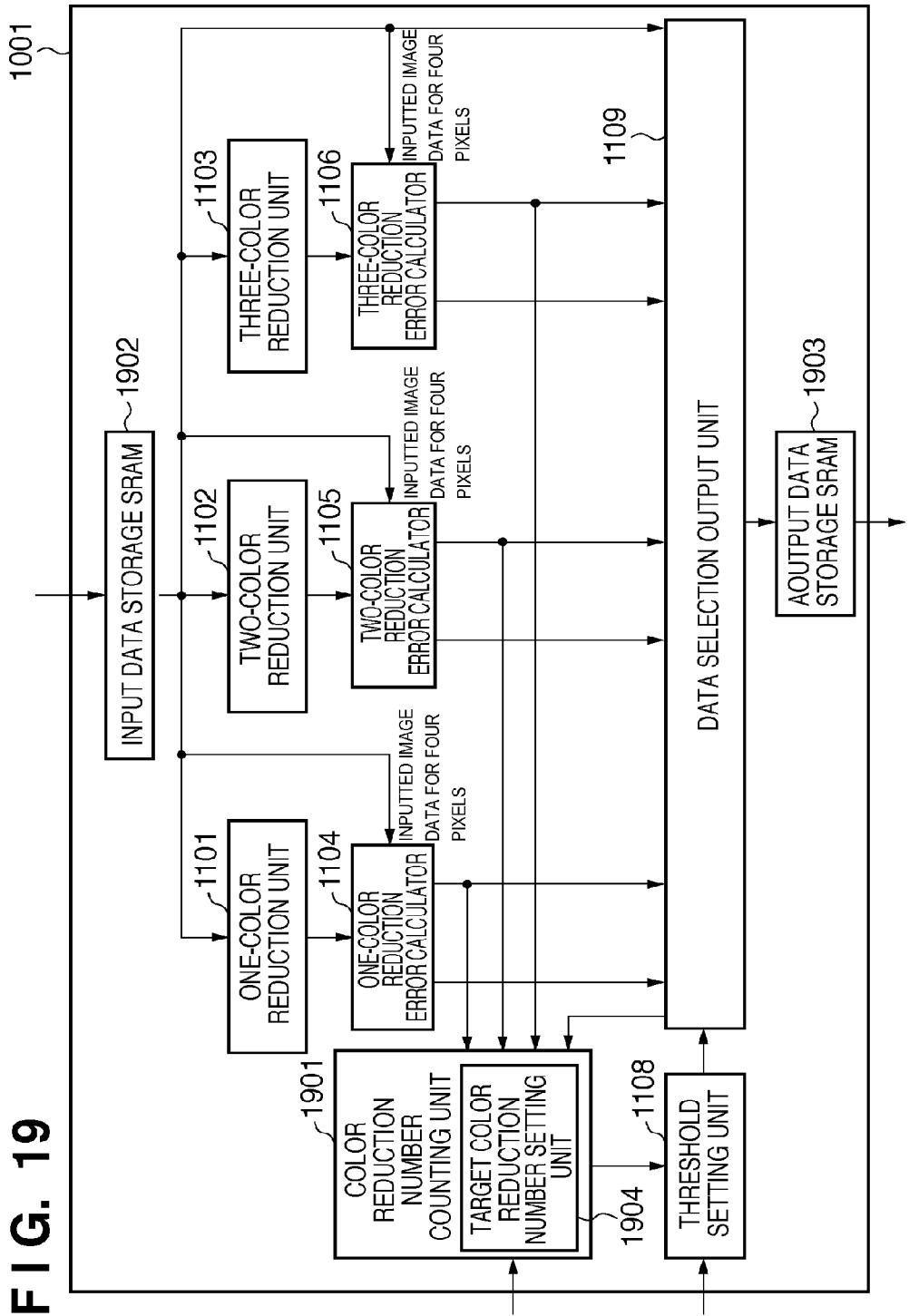

IMAGE PROCESSING APPARATUS, METHOD, AND STORAGE MEDIUM FOR HIGH SPEED COMPRESSION PROCESSING

BACKGROUND OF THE INVENTION

1. Field of the Invention

The present invention relates to an image processing apparatus for compressing image data, to a compression method used in an image processing apparatus, and to a storage medium for storing programs thereof.

2. Description of the Related Art

Demand for high-resolution color images has steadily risen up to now, and digital copiers routinely handle images whose resolution is 1200 dpi or higher. As the resolution of images has risen, there has been a dramatic leap in the number of pixels that have to undergo image processing, and this has sent the processing load even higher. For example, when the resolution doubles from 600 dpi to 1200 dpi, the number of pixels that have to be processed quadruples. This is not limited to digital copiers, and even with digital cameras, facsimile devices, and other such image processing apparatus, the compression of color image data is performed in order to shorten processing time by reducing the memory/hard-disk space or shortening how long it takes to write to these media.

Compression formats that are commonly used for color still pictures include the JPEG format, which makes use of a discrete cosine transform, and a format featuring a wavelet transform. With such coding formats, generally image data is encoded in specific blocks (such as 8×8 pixel or 16×16 pixel units), and discrete cosine transform, quantization, and entropy encoding are performed to achieve a high compression efficiency. Such coding formats are variable length coding formats, so the amount of coding varies for each group of image data to be coded.

After the image data has been compressed by one of the methods discussed above, it is necessary to decode the compressed image data, in order to process the image data using that image data as reference, since no image processing can be performed with the compressed image data the way it is. Therefore, decoding processing is required in pixel units with respect to all pixels of high resolution data, which causes processing time increase.

Also, the compression method can be a known run-length compression method in which pixel data and the run length thereof are stored, or the method discussed in Japanese Patent Laid-Open No. 2008-271046, in which the amount of data is compressed by performing color reduction to two colors or less for each block, and outputting color data for two colors and the layout pattern of those two colors.

With the method in Japanese Patent Laid-Open No. 2008-271046, there are always two or fewer colors in a block, but to further enhance picture quality, the applicant also considers a technique in which, with a 2×2 block, a maximum of four colors is allowed for each block in compression. In the proposal in Japanese Patent Application No. 2009-221444, first the image data is divided into blocks (such as blocks with a size of 2×2 pixels), and the color data for the pixels in the block are compared, so that layout pattern information about the color data included in a block of interest and color data information for the number of colors included in the block of interest are outputted. The outputted color data information is divided into first color data information corresponding to a pixel in a predetermined position of the block (color data information for the upper-left pixel in a block with a size of 2×2 pixels), and other color data information (second to fourth color data information), which are stored in a memory region. Specifically, a technique is proposed in which the layout pattern information obtained for the blocks, the first color data information, and the other color data information are compiled and stored each in different memory regions. Also, with the proposal in Japanese Patent Application No. 2009-221444, in comparing the color data for the blocks, it is possible to compare the difference in color between pixels in the block (pixel value) with a threshold, perform color reduction if the difference is less than this threshold, and thereby increase the compression ratio.

On the other hand, the original image can be reproduced more faithfully when color reduction is performed as little as possible, so although reducing the threshold of color reduction processing does afford better picture quality, it ends up lowering the compression ratio. Also, depending on the system, there may be situations in which there is a limit to the memory size that can be used to store one page of image data, for example. When color reduction is performed according to the proposal in Japanese Patent Application No. 2009-221444, how much the amount of data is reduced according to the threshold of color reduction will vary with the image being processed, and therefore is not known before the color reduction is performed. Thus, to maintain the picture quality as high as possible while keeping the amount of data at or under a target compression ratio for a given set of input image data, recompression has to be repeated while varying the threshold setting until that compression ratio is attained, and as a result, the compression processing takes a long time until the target value is reached.

SUMMARY OF THE INVENTION

An aspect of the present invention is to eliminate the above-mentioned problems with the conventional technology. The present invention provides an image processing apparatus with which the compression processing of image data is performed at high speed, a compression method used in an image processing apparatus, and a storage medium for storing programs.

The present invention in its first aspect provides an image processing apparatus, comprising: an input unit configured to input image data; a division unit configured to divide the image data inputted by the input unit into blocks, each of the blocks has M×N pixels (where M and N are integers greater than or equal to 2); a color-reduction unit configured to perform first reduction of the number of colors of each of the blocks from M×N to each number of colors, the each number of colors is from one to (M×N−1); an acquisition unit configured to acquire differences between pixel values for each of the blocks after the first color reduction by the color-reduction unit, and pixel values for each of the blocks before the first color reduction; a generation unit configured to generate a first table in which a plurality of thresholds are associated with either the amount of data to be reduced or the amount of data to be remained, based on the differences acquired by the acquisition unit; a specifying unit configured to specify a threshold at which the amount of data after compression of the image data drops to or below a target data amount, based on the first table; and a compression unit configured to perform second reduction of the number of colors of each of the blocks based on the threshold specified by the specifying unit, and to generate compressed data based on the image data after the second color reduction.

The present invention in its second aspect provides a compression method comprising: an input step of inputting image data; a division step of dividing the image data inputted by the input unit into blocks, each of the blocks has M×N pixels (where M and N are integers greater than or equal to 2); a color reduction step of performing first reduction of the number of colors of each of the blocks divided from M×N to each number of colors, the each number of colors is from one to (M×N−1); an acquisition step of acquiring differences between pixel values for each of the blocks after the first color reduction in the color reduction step, and a pixel value for each of the blocks before the first color reduction; a generation step of generating a first table in which a plurality of thresholds are associated with either the amount of data to be reduced or the amount of data to be remained, based on the differences acquired by the acquisition unit; a specifying step of specifying a threshold at which the amount of data after compression of the image data drops to or below a target data amount, based on the first table; and a compression step of performing second reduction of the number of colors of each of the blocks based on the threshold specified in the specifying step, and generating compressed data based on the image data after the second color reduction.

The present invention in its third aspect provides a computer-readable storage medium that stores programs for causing a computer to function as: a division unit configured to divide image data into blocks, each of the blocks has M×N pixels (where M and N are integers greater than or equal to 2); a color-reduction unit configured to perform first reduction of the number of colors of each of the blocks from M×N to each number of colors, the each number of colors is from one to (M×N−1); an acquisition unit configured to acquire differences between pixel values for each of the blocks after the first color reduction by the color-reduction unit, and a pixel values for each of the blocks before the first color reduction; a generation unit configured to generate a first table in which a plurality of thresholds are associated with either the amount of data to be reduced or the amount of data to be remained, based on the differences acquired by the acquisition unit; a specifying unit configured to specify a threshold at which the amount of data after compression of the image data drops to or below a target data amount, based on the first table; and a compression unit configured to perform second reduction of the number of colors of each of the blocks based on the threshold specified by the specifying unit, and to generate compressed data based on the image data after the second color reduction.

With the present invention, compression processing can be performed at high speed when compressing image data to or below a target amount of data.

Further features of the present invention will become apparent from the following description of exemplary embodiments with reference to the attached drawings.

BRIEF DESCRIPTION OF THE DRAWINGS

FIG. 3 is a diagram showing the layout patterns of colors constituting a block.

FIG. 4 is a diagram showing the correspondence between layout patterns and pattern flags.

FIG. 15 is a diagram illustrating the relation between tiles and blocks in a second embodiment.

FIG. 16 is a diagram illustrating an example of the packet structure in a second embodiment.

FIG. 19 is a diagram of another constitution when color reduction processing is executed by hardware.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Those constituent elements that are the same will be numbered the same, and will not be redundantly described.

First Embodiment

Figure 1:
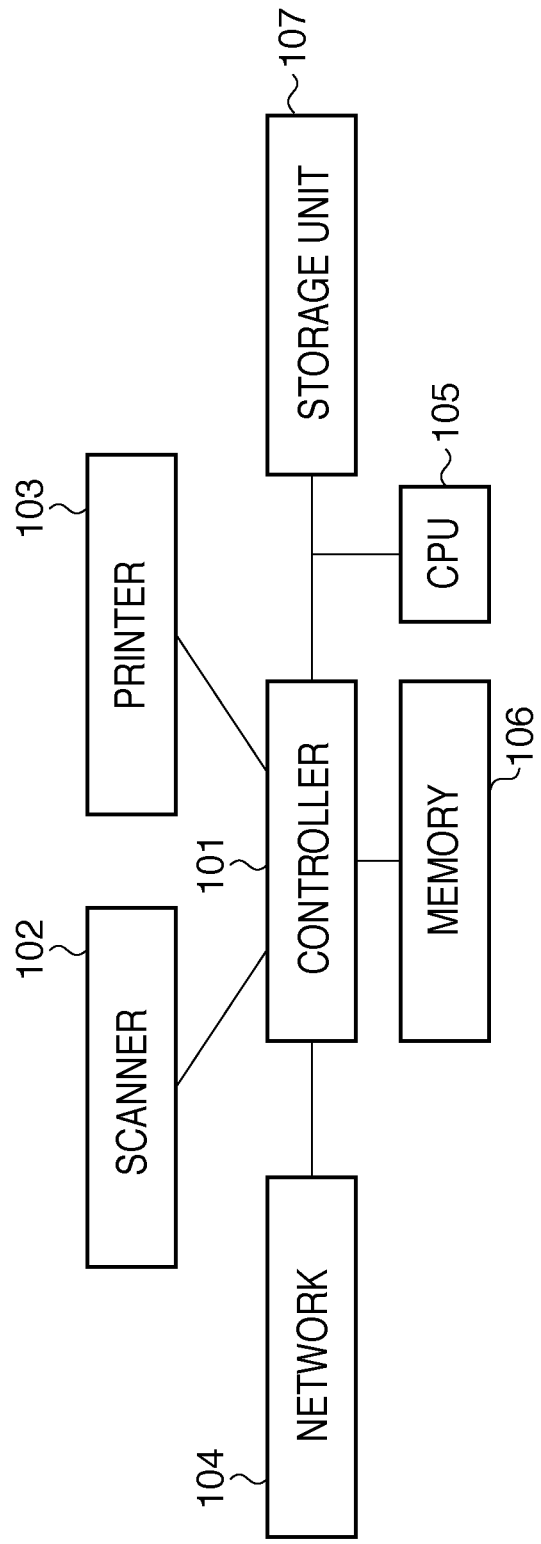
FIG. 1 is a diagram of the main constitution of an image processing apparatus.

FIG. 1 is a diagram of the main constitution of the image processing apparatus used in an embodiment pertaining to the present invention. In this embodiment, a multifunction peripheral (MFP) having a plurality of functions, such as a scan function, a print function, and a copy function, is used as an example of an image processing apparatus. As shown in FIG. 1, a controller 101 is connected to a scanner 102 (an image input unit) and a printer 103 (an image output unit). The controller 101 is also connected to a network 104, such as a LAN or a wide area network (WAN), so that the input and output of image information and device information can be performed. The controller 101 also performs the image decompression of PDL data. A CPU 105 controls the entire image processing apparatus according to programs stored in a storage unit 107. A memory 106 functions as a system working memory for the operation of the CPU 105, or an image memory for the temporary storage of image data. The storage unit 107 is a hard disk drive, and stores system software, programs, image data, and the like.

Figure 2:
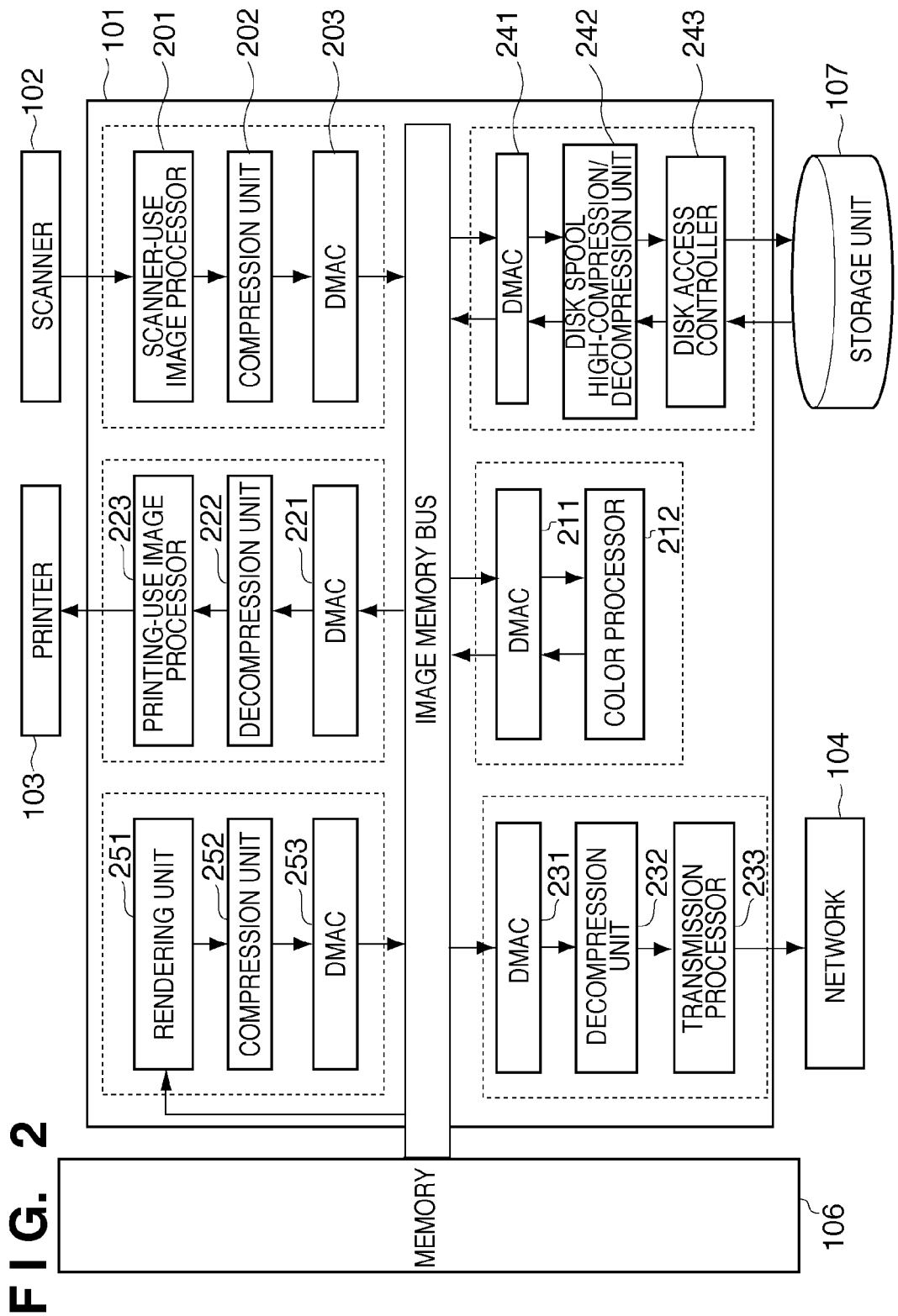
FIG. 2 is a diagram of the internal constitution of a controller.

FIG. 2 is a diagram of the internal constitution of the controller 101.

A situation will be described in which image data is read by the scanner 102. A scanner-use image processor 201 inputs image data for three colors (RGB: red, green, blue), read by the scanner 102, subjects the inputted image data to shading, filtering, or other such image processing, and outputs the result to a compression unit 202. The compression unit 202 subjects the image data inputted from the scanner-use image processor 201 to compression processing. A DMAC (direct memory access controller) 203 stores this compressed image data (compressed data) in the memory 106 via an image memory bus.

Next, a situation will be described in which image data read by the scanner 102 is printed. A DMAC 221 outputs the compressed data stored in the memory 106 to a color processor 212 via an image memory bus. The color processor 212 converts this compressed data into data for the CMYK (cyan, magenta, yellow, black) color space. After this, the color processor 212 subjects the CMYK data to density adjustment, printer gamma correction, and other such color processing. A DMAC 211 again stores the color processed data in the memory 106 via an image memory bus. The DMAC 221 reads the compressed data stored in the memory 106 via the image memory bus in order to perform image processing for printing. A decompression unit 222 decompresses the compressed data that has been read into raster image data. A printing-use image processor 223 inputs the raster image data (CMYK image data), performs surface area gradation processing by dithering or error diffusion method, and outputs the result of the printer 103.

Next, a situation will be described in which image data read by the scanner 102 is sent to a network. The DMAC 211 outputs the compressed data stored in the memory 106 to the color processor 212 via the image memory bus. The color processor 212 subjects this compressed data to display gamma adjustment, paper base color adjustment, and so forth, and converts to data for a YCbCr (brightness, blue color difference, red color difference) color space. The DMAC 211 again stores the data processed by the color processor 212 in the memory 106 via the image memory bus. A DMAC 231 outputs the compressed data stored in the memory 106 to a decompression unit 232 via the image memory bus in order to perform image processing for network transmission. The decompression unit 232 decompresses this compressed data into raster image data. A transmission processor 233 subjects the raster image data (YCbCr image data) to JPEG compression processing in the case of color image transmission, or in the case of monochrome binary image transmission, subjects Y data to binarization to perform JBIG compression or the like, and sends the result to the network 104.

Next, a situation will be described in which image data read by the scanner 102 is stored. A DMAC 241 outputs the compressed data stored in the memory 106 to a disk spool high-compression/decompression unit 242 via the image memory bus. The disk spool high-compression/decompression unit 242 performs even higher-compression JPEG compression on the compressed data, the reason being how slowly the hard disk drive writes to the memory. A disk access controller 243 stores the compressed data in the storage unit 107. Also, the above processing is performed in reverse if the compressed data stored in the storage unit 107 is again outputted to the memory 106.

Next, a situation will be described in which PDL data received from another apparatus connected via the network 104 is written to the memory 106. In FIG. 2, the CPU 105, which functions as a PDL interpreter (not shown), interprets PDL data and stores the result (a display list) in the memory 106. A rendering unit 251 renders the display list stored in the memory 106 into RGB data, which is raster image data. A compression unit 252 subjects the rendered RGB image data to image compression processing. A DMAC 253 stores the data that has undergone image compression processing in the memory 106 via the image memory bus. If the PDL data received from another apparatus is printed, or sent to a network, or stored, the same processing is performed as with the image data described above.

Next, the compression processing of raster image data in this embodiment will be described. In this embodiment, the compression unit 252 compresses the raster image generated from PDL data, and the compression unit 202 compresses the raster image read by the scanner 102. However, the compression processing of the raster image data need not consist of these two compression units. For example, as shown in FIG. 2, rather than separately providing the compression unit 202 and the compression unit 252, a shared compression unit may be provided. In this embodiment, first the raster image data in page units is divided into blocks of 2×2 pixel units (an example of M×N pixels (where M and N are integers greater than or equal to 2)), and compression processing is performed on these divided block units. Here, before describing the compression processing of the present invention, let us consider the combinations of the numbers of colors of the four pixels in a 2×2 pixels (one block). If each of the four pixels expresses a different color, there are the maximum of four colors in the block. Therefore, the number of colors in a block can range from one to four colors.

FIG. 3 is a diagram showing the layout patterns of colors in a block when we consider situations in which the number of colors is from one to four colors. First, when the number of colors constituting a block is one, this means that the four pixels are all of the same color. Therefore, there is only one layout pattern. Let us now consider the case of two or more colors. If the number of colors constituting a block is two (which will be called the first color and second color, respectively), as shown in FIG. 3, the number of patterns when the two colors are laid out among four pixels is seven, since if we term the color of the pixel in a specific position (in this embodiment, the upper-left pixel) as the first color, the three pixels other than the upper-left pixel will be either the first color or the second color, and we exclude the case of all four pixels being the same color. Let us now consider a case in which the number of colors constituting a block is three (first color to third color). The number of patterns when three colors are laid out among four pixels can also be called the number when one of the three colors is used twice. Therefore, the number of patterns may be found for when two of the four pixels are the same color. That is, the number with three colors is the number of combinations when two of the four pixels are taken, so there are six patterns. Also, when the number of colors constituting a block is four (first color to fourth color), there is only one pattern. Therefore, if we total up the numbers for all of the first to fourth colors in a block, we find there are 15 patterns. Also, when flags (identifiers) for identifying all of these patterns are attached, four bits of data are required for these flags. The correspondence between these 15 patterns and flags is defined as shown in FIG. 4. These flags will hereinafter also be referred to as "pattern flags."

Figure 5:
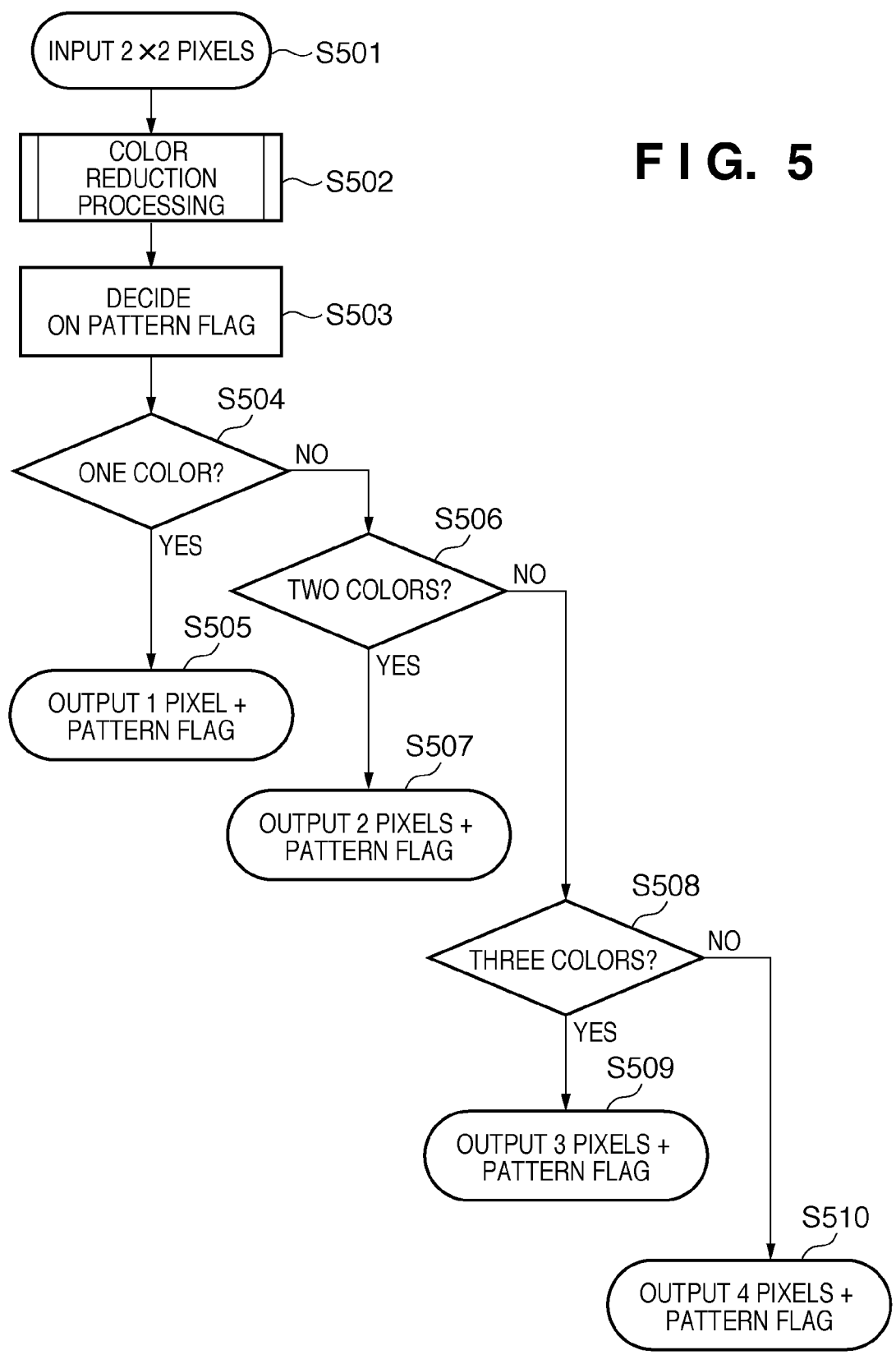
FIG. 5 is a flowchart of the procedure used in compression processing in a first embodiment.
Figure 10:
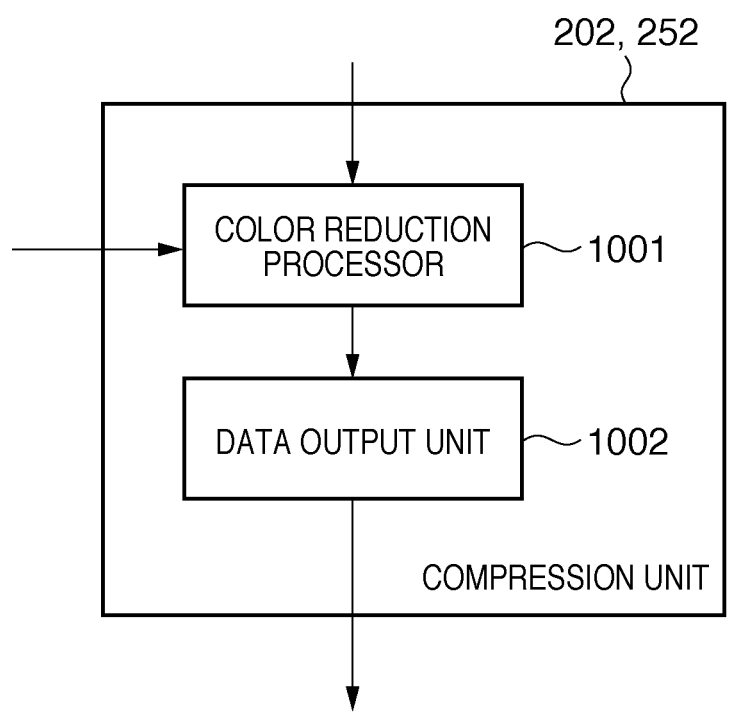
FIG. 10 is a block diagram of the internal constitution of a compression unit.

Next, the compression processing performed by the compression units 202 and 252 will be described through reference to FIGS. 5 and 10. FIG. 5 is a flowchart of the procedure used in this compression processing. FIG. 10 is a block diagram of the internal constitution of the compression units 202 and 252. Here, the amount of data per pixel is 24 bits of image data, which is 8 bits each for RGB (that is, 256 tones).

First, image data corresponding to one block of 2×2 pixels is inputted from the scanner-use image processor 201 or the rendering unit 251 (S501). The inputted image data is transferred to a color reduction processor 1001, and color reduction processing within that block is performed (S502). The color reduction processing performed by the color reduction processor 1001 will be discussed in detail below. The color reduction processor 1001 subjects the inputted image data to color reduction processing, after which a pattern flag is generated indicating the number of colors after color reduction and the layout pattern of the colors, and the corresponding image data for 2×2 pixels that have undergone color reduction processing is transferred to a data output unit 1002. The data output unit 1002 decides on the layout pattern and the number of colors within the block from the pattern flag transferred from the color reduction processor 1001, and color data is acquired for each of the colors (S503). As shown in FIG. 4 (an example of a second table), the layout pattern of the colors and the number of colors constituting the block are associated according to a 4-bit pattern flag, so color data for each of the colors constituting the block can be acquired from the pattern flag.

In FIG. 4 here, in all of the patterns the pixel value (that is, the color expressed by the pixel) at a specific position (the upper-left in this embodiment) is defined so as to be a first color value (first color data). When the pattern flag is 0, the number of colors is 1, so the upper-left pixel value is acquired as the first color value. With pattern flags 1 to 7, the number of colors is 2, so the upper-left pixel value is acquired as the first color value, and the pixel value at the position of a second color value (second color data) defined according to each pattern flag is further acquired. For example, if the pattern flag is 1, the upper-right pixel value is acquired as the second color value. With pattern flags 8 to D, the number of colors is 3, so the upper-left pixel value is acquired as the first color value, and the pixel values at the positions of the second color (second color data) and third color (third color data) defined according to each pattern flag are acquired as the second color value and a third color value. For example, if the pattern flag is 8, the upper-left pixel value is acquired as the first color value, the upper-right pixel value as the second color value, and the lower-right pixel value as the third color value. If the pattern flag is E, the upper-left pixel value is acquired as the first color value, the upper-right pixel value as the second color value, the lower-left pixel value as the third color value, and the lower-right pixel value as a fourth color value (fourth color data).

Figure 6:
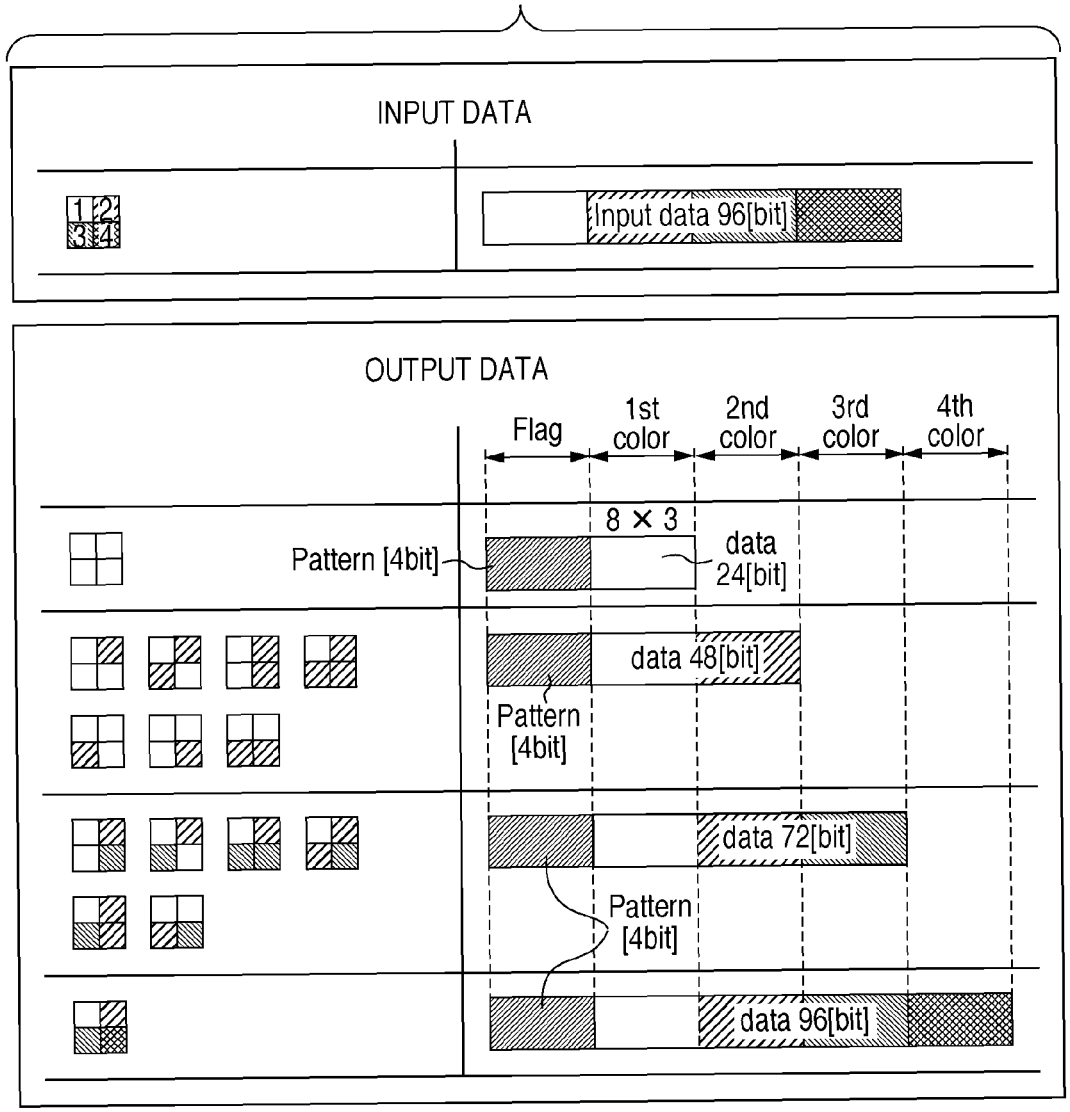
FIG. 6 is a diagram illustrating examples of data outputted by a data output unit.

The data output unit 1002 specifies the number of colors constituting a block based on the transferred pattern flags (S504, S506, and S508), and outputs pattern flags and color data according to the specified numbers of colors (S505, S507, S509, and S510). The data outputted by the data output unit 1002 will be described through reference to FIG. 6.

A case in which the pattern flag is 0 (Yes in S504) will be described. The fact that the pattern flag is 0 indicates that the four pixels that make up the block are all the same color. In this case, since there is no color data for the second and subsequent colors, the four bits of the pattern flag are outputted along with the pixel value for the first color (24 bits of color data) (S505). Let us now describe the case when the pattern flag is from 1 to 7 (Yes in S506). The fact that the pattern flag is from 1 to 7 means that there are two colors of the four pixels that make up the block. In this case, the positions of the pixels with the second color are found from the pattern flag, and four bits of the pattern flag and the pixel values for two colors (color data equivalent to 2 pixels×24 bits (that is, 48 bits)) are outputted (S507). Let us now describe the case when the pattern flag is from 8 to D (Yes in S508). The fact that the pattern flag is from 8 to D indicates that there are three colors of the four pixels that make up the block. In this case, the positions of the pixels with the second and third colors are found from the pattern flag, and four bits of the pattern flag and the pixel values for three colors (color data equivalent to 3 pixels×24 bits (that is, 72 bits)) are outputted (S509). Let us now describe the case when the pattern flag is E (No in S508). The fact that the pattern flag is E indicates that there are four colors of the four pixels that make up the block. In this case, four bits of the pattern flag and the pixel values for four colors (color data equivalent to 4 pixels×24 bits (that is, 96 bits)) are outputted (S510). In other words, when the positions within the block are scanned in order (from upper-left to upper-right, lower-left, and lower-right, with these positions being numbered as 1, 2, 3, and 4, respectively), the color data outputted from each block correspond to the fact that color data that had not yet appeared is outputted in order every time it appears.

Thus, the data output unit 1002 outputs and stores in memory the color data for four colors in a block of 2×2 pixels (96 bits), the four bits of pattern flag, and the data for pixel values equivalent to the number of colors in the block (an example of first storage). As a result, the amount of image data can be easily reduced from the inputted image data. In particular, the more a raster image includes blocks having pixels of the same color in a single block of 2×2 pixels (that is, blocks made up of fewer colors), the greater is the compression ratio of the amount of image data being outputted. This processing can be performed on all the blocks included in the raster image data, allowing the raster image data in its entirety to be compressed.

Figure 9:
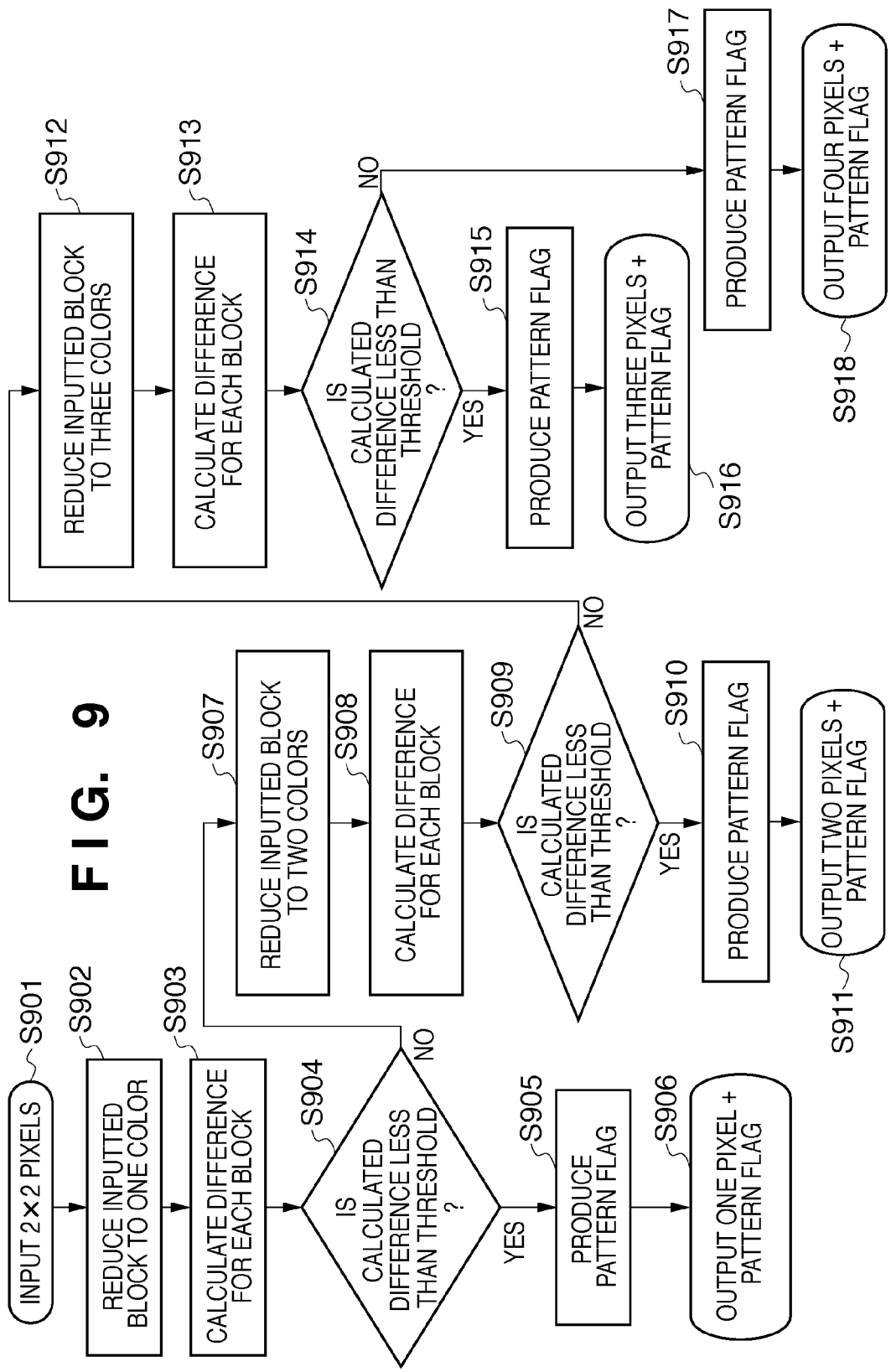
FIG. 9 is a flowchart of the procedure used in color reduction processing.

The processing performed by the color reduction processor 1001 will now be described. FIG. 9 is a flowchart of the procedure used in color reduction processing by the color reduction processor 1001. First, image data equivalent to one block of 2×2 pixels is inputted (S901). Then, a one-color reduction unit 1101 performs color reduction processing to one color from the pixel values for the four pixels (S902). The pixel values will hereinafter be expressed by RGB values, for example. In this embodiment, color reduction to one color is performed by calculating the average pixel value for the four pixels. The difference between the color-reduced pixel value and the individual pixel values of the four inputted pixels is then calculated (S903), and this result is compared with a preset threshold (S904). For instance, the absolute values for the difference between the pixel value inputted for each pixel and the pixel value after color reduction are summed for four pixels, and this sum is compared with a threshold. (The sum of the absolute values for the difference between the pixel value inputted for each pixel and the pixel value after color reduction is used to calculate the difference between the pixel values inputted for each of the four pixels in S903, S908, and S913 in this embodiment and the pixel values for the four pixels after color reduction processing.) If this difference is determined to be lower than the threshold, a determination is made to reduce to one color, the pattern flag is decided to be 0 (S905), and this pattern flag and the image data that has been color-reduced to one color are outputted to the data output unit 1002 (S906). On the other hand, if the difference is determined to be higher than the threshold, color reduction processing down to two colors is performed (S907). In this embodiment, of the four pixels, the two with the greatest difference in pixel value (termed pixels A and B) are selected, the remaining two pixels are clustered according to whether they are closer to pixel A or B, and an average value is found for each cluster, thereby determining two colors. The difference between the pixel value for each of the four pixels reduced to two colors and the inputted pixel value for each of the four pixels is then calculated (S908), and this result is compared with a preset threshold (S909).

If the difference here is determined to be lower than the threshold, a pattern flag is decided according to the position of a pixel value that has undergone color reduction to two colors, based on the correlation in FIG. 4 (S910). The image data that has undergone color reduction to two colors and the pattern flag are then outputted to the data output unit 1002 (S911). On the other hand, if the difference is determined to be higher than the threshold, color reduction processing to three colors is performed (S912). In this embodiment, of the four pixels, the two with the smallest difference in pixel value are selected, the average value is found for these two pixels, and this is combined with the pixel value for the other two pixels for color reduction to three colors. The difference between the pixel value for each of the four pixels reduced to three colors and the inputted pixel value for each of the four pixels is calculated (S913), and this result is compared with a preset threshold (S914).

If the difference here is determined to be lower than the threshold, a pattern flag is decided on according to the position of the pixel values obtained by color reduction to three colors, based on the correlation shown in FIG. 4 (S915). The image data obtained by color reduction to three colors and the pattern flag are then outputted to the data output unit 1002 (S916). On the other hand, if it is determined that the difference is higher than the threshold, the block is determined to be one with which visual problems would be caused by color reduction, the pattern flag is decided to be E (S917), and the image data with its original four colors and the pattern flag are outputted to the data output unit 1002 (S918).

Figure 11:
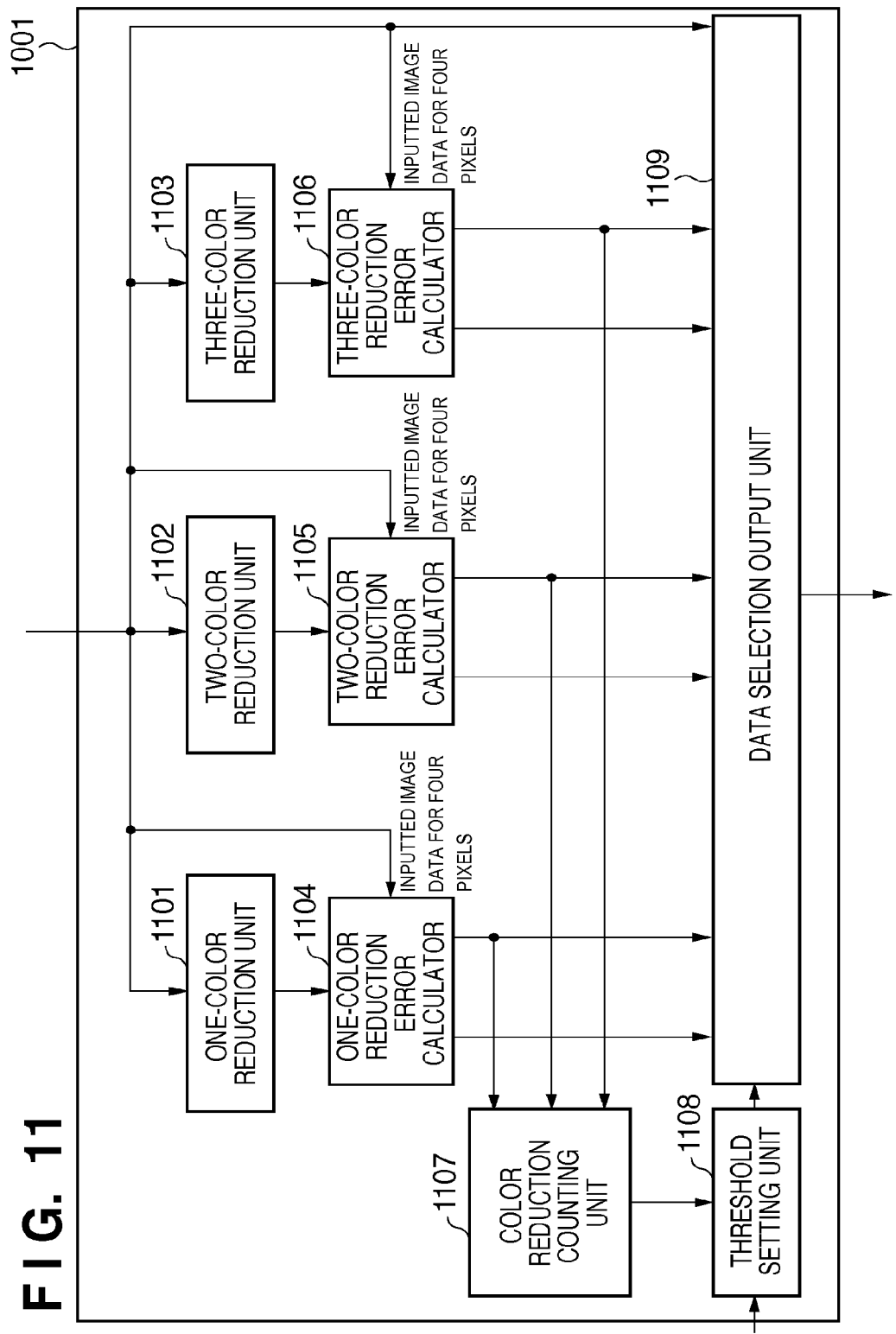
FIG. 11 is a diagram illustrating the constitution when color reduction processing is executed by hardware.

Rather than being the sequential processing shown in FIG. 9, the above-mentioned color reduction processing may be simultaneous parallel processing using the hardware shown in FIG. 11. Specifically, color reduction processing to one color (S902), color reduction processing to two colors (S907), and color reduction processing to three colors (S912) may be executed in parallel on the image data inputted for one block of 2×2 pixels with the one-color reduction unit 1101, a two-color reduction unit 1102, and a three-color reduction unit 1103. The image data for four pixels obtained by color reduction with the color reduction units and the inputted image data for four pixels are transferred to a one-color reduction error calculator 1104, a two-color reduction error calculator 1105, and a three-color reduction error calculator 1106. These color reduction error calculators perform parallel calculation of the difference between the pixel values for image data inputted for four pixels and the pixel values for the four pixels after color reduction (S903, S908, and S913). The differences calculated by the color reduction error calculators are transferred along with the image data for four pixels after color reduction processing to a data selection output unit 1109. The data selection output unit 1109 performs a parallel comparison of the threshold set at a threshold setting unit 1108 with the differences calculated by the color reduction error calculators (one-color reduction error, two-color reduction error, and three-color reduction error) (S904, S909, and S914). The pattern flag and color-reduced pixel values corresponding to a difference determined to be lower than the threshold are then outputted.

If the differences here (one-color reduction error, two-color reduction error, and three-color reduction error) are lower than the threshold, the image data and pattern flag to be outputted are selected, giving priority in the order of one-color reduction error, two-color reduction error, and three-color reduction error. If all of the differences are higher than the threshold, the inputted image data and the pattern flag E indicating four colors are outputted.

Figure 12:
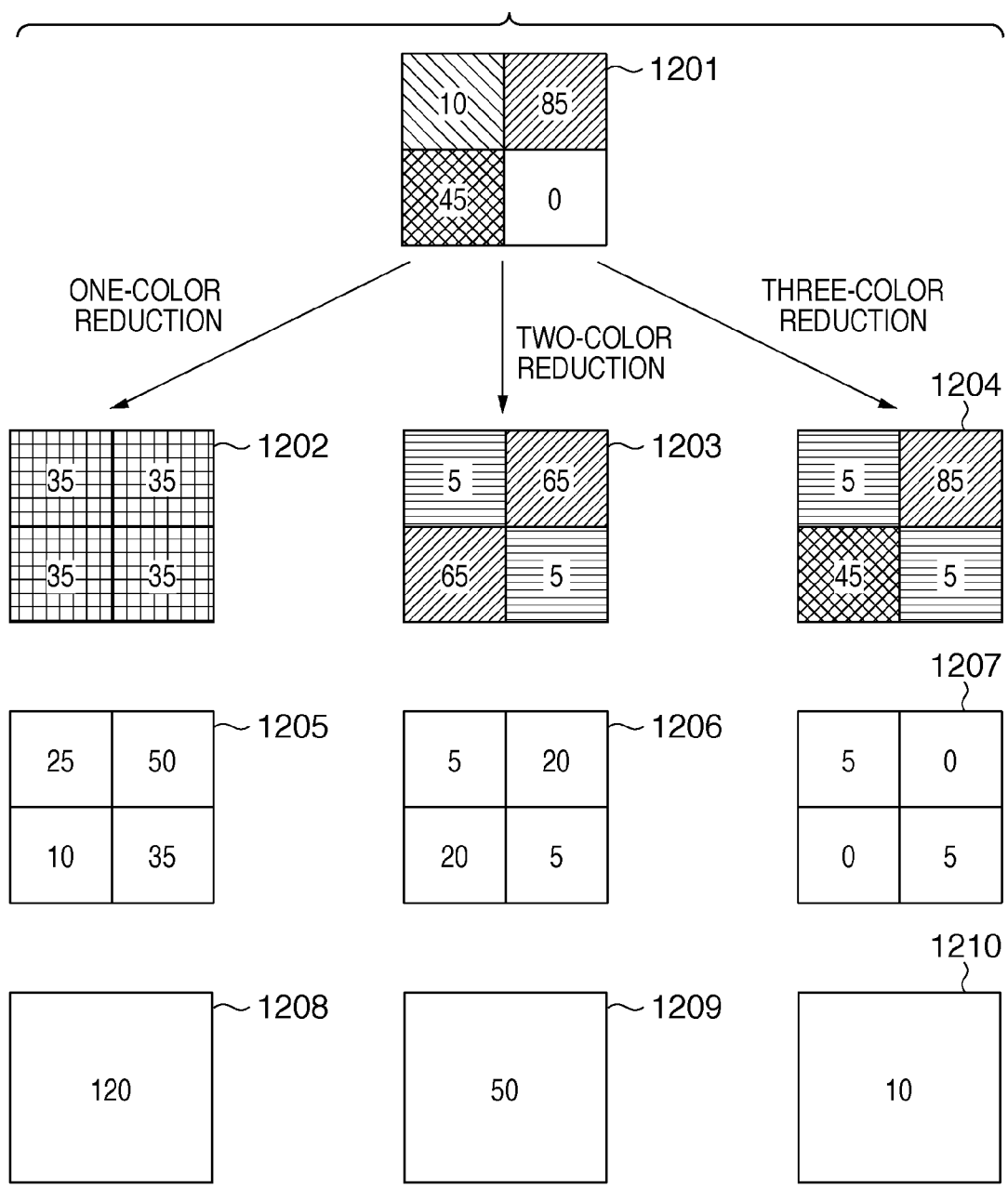
FIG. 12 is a diagram illustrating a specific example of color reduction processing.

The above-mentioned color reduction processing will be described in more specific terms through reference to FIG. 12. For the purposes of describing FIG. 12, 8-bit data (0-255) will be used as the pixel values for inputted image data in order to simplify the description. When processing is performed on 24-bit data of RGB 8 bits, the processing on 8-bit data discussed below can be decompressed.

First, when image data 1201 for 2×2 pixels is inputted, it undergoes color reduction to the numbers of colors of the one-color reduction unit 1101, the two-color reduction unit 1102, and the three-color reduction unit 1103, respectively. For example, with the one-color reduction unit 1101, an average value is found for the four pixels of the image data 1201, and a color reduction result such as image data 1202 is obtained. Similarly, with the two-color reduction unit 1102 and the three-color reduction unit 1103, color reduction results such as image data 1203 and 1204 are obtained by averaging close colors.

Next, the image data 1201 and the image data 1202 to 1204 are inputted to the respective color reduction error calculators, and difference data 1205 to 1207 are calculated for each pixel. Furthermore, the total values of these in color reduction to one color, color reduction to two colors, and color reduction to three colors are termed the differences 1208 to 1210 for each block. The image data 1201 and 1202 to 1204 and the differences 1208 to 1210 are then transferred to the data selection output unit 1109. These differences 1208 to 1210 express error in block units after color reduction to one to three colors (in this embodiment, these are also called one-color reduction error, two-color reduction error, and three-color reduction error.)

When a threshold 20 is set by the threshold setting unit 1108, it is compared by the data selection output unit 1109 with the differences 1208 to 1210, the difference 1210 that is lower than the threshold 20 is specified, and the image data 1204 that has undergone color reduction to three colors corresponding to this difference 1210 is selected and outputted. Therefore, as discussed above, with the threshold 20, the image data "5," "85," "45," and "5" for the image data 1204, and the pattern flag "9" corresponding to the layout pattern of the image data 1204 are outputted.

Also, when a threshold 60 is set by the threshold setting unit 1108, the image data 1203 and 1204 corresponding to the differences 1209 and 1210 that are lower than the threshold 60 are candidates for output by the data selection output unit 1109. The image data 1203 that has undergone color reduction to two colors, which allows the amount of output data to be further reduced, is selected for output according to the priority order mentioned above. Therefore, with the threshold 60, the image data "5," "65," "65," and "5" for the image data 1203, and the pattern flag "2" corresponding to the layout pattern of the image data 1203 are outputted.

Figure 13:
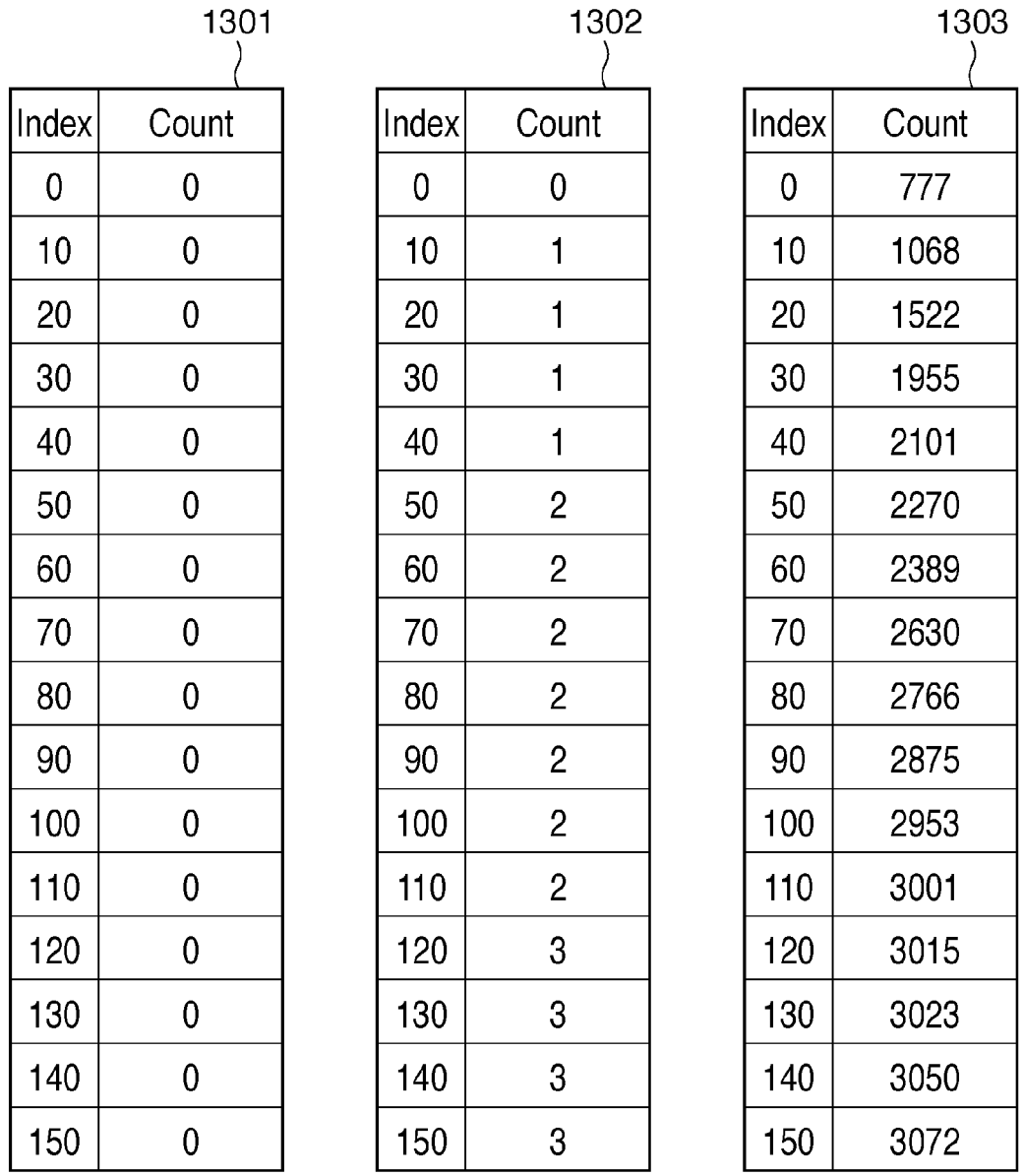
FIG. 13 is a diagram illustrating the operation of a counter.

Next, a color reduction counting unit 1107 used in this embodiment will be described. The color reduction counting unit 1107 finds a total indicating how much reduction of colors there has been on the entire page when the threshold is set by the threshold setting unit 1108, based on the differences (color reduction errors) between the blocks outputted from the above-mentioned color reduction error calculators 1104 to 1106. The color reduction counting unit 1107 inputs three differences, namely, the one-color reduction error, two-color reduction error, and three-color reduction error, calculated by the color reduction error calculators 1104 to 1106, for the processing of each block of 2×2 pixels. A counter 1301 for index values is provided in the interior as shown in FIG. 13, and the counter is increased based on the inputted three differences. The index values referred to here are indexes indicating the thresholds that can be set by the threshold setting unit 1108. In this embodiment, the threshold index is taken in units of 10, but this is not the only option, and the units may be finer (such as units of 5). When a block of 2×2 pixels such as the image data 1201 in FIG. 12 has been inputted, the "120," "50," and "10" of the differences 1208 to 1210 are inputted to the color reduction counting unit 1107. The color reduction counting unit 1107 increments the counter for index values not less than the respective color reduction errors. Specifically, first, counters for index values of 10 or more are incremented by one with respect to a "10" of the difference 1210. Then counters for index values of 50 and 120 or more are incremented by one with respect to the "50" of the difference 1209 and the "120" of the difference 1208. When one block is processed, this processing is equivalent to not increasing the counter with respect to an index value less than the three-color error for that block (the difference 1210), increasing the counter by one with respect to the an index value less than the two-color error (the difference 1209) and at least the three-color error (the difference 1210), increasing the counter by two with respect to an index value less than the one-color error (the difference 1208) and at least the two-color error (the difference 1209), and increasing the counter by three with respect to an index value that is at least the one-color error (the difference 1208). Therefore, when the image data 1201 is inputted, the counter 1301 is updated to the counter 1302. The value of this counter 1302 becomes the index for the amount of data to be reduced when the index values are set as the threshold by the threshold setting unit 1108. For example, when values from 10 to 40 are set as the threshold by the threshold setting unit 1108, the inputted image data 1201 undergoes color reduction processing to three colors by the color reduction processor 1001. That is, since the colors of the output data are reduced to three colors with respect to the inputted amount of data for four pixels in a block of 2×2 pixels (that is, the amount of color data for four colors), the amount of color data outputted becomes three colors' worth of color data, and this expresses that the amount of data has been reduced by one color. Specifically, a counter value of "1" with respect to index values of 10 to 40 indicated by the counter 1302 can be used as an index indicating that the amount of color data has been reduced by one color.

Similarly, when values from 50 to 110 are set as the threshold by the threshold setting unit 1108, the inputted image data 1201 undergoes color reduction processing to two colors by the color reduction processor 1001, and the colors of the output data are reduced to two colors with respect to the inputted amount of data for four pixels, so the amount of color data outputted becomes two colors' worth of color data, indicating that the amount of data has been reduced by two colors. Specifically, a counter value of "2" with respect to index values of 50 to 110 can be used as an index indicating that the amount of color data has been reduced by two colors.

When a value of at least 120 is set as the threshold by the threshold setting unit 1108, the inputted image data 1201 undergoes color reduction processing to one color by the color reduction processor 1001, and the colors of the output data are reduced to one color with respect to the inputted amount of data for four pixels, so the amount of color data outputted becomes one color's worth, and this expresses that the amount of data has been reduced by three colors. Specifically, a counter value of "3" with respect to an index value of 120 or higher can be used as an index indicating that the amount of color data has been reduced by three colors.

As discussed above, if the threshold is set according to this counter value, it can be ascertained how much the amount of data has been reduced. FIG. 13 shows the situation for one block of 2×2 pixels, which will now be described. The counter for the index value is not increased if it is less than the color reduction error (first difference) after color reduction from M×N colors (where M and N are integers greater than or equal to 2) to M×N−1 colors. The counter for an index value that is at least the first difference and less than the color reduction error (second difference) after color reduction from M×N colors to M×N−2 colors is incremented by one.

To describe this in general terms, a counter corresponding to a threshold index less than the first difference after color reduction from (M×N) colors to (M×N−1) colors is not increased, but a counter corresponding to a threshold index that is at least a K-th difference after color reduction from (M×N) colors to (M×N−K) colors and less than a (K+1)-th difference after color reduction from (M×N) colors to (M×N−K−1) colors is increased by K (where K=1, 2, . . . , M×N−2).

A counter corresponding to a threshold index that is at least a second difference and less than the color reduction error (a third difference) after color reduction from M×N colors to M×N−3 colors is incremented by 2. From here on processing is performed in the same manner, and the counter is incremented by M×N−2 with respect to an index value that is at least the color reduction error (an (M×N−2)-th difference) after color reduction from M×N colors to two colors and is less than the color reduction error (an (M×N−1)-th difference) after color reduction from M×N colors to one color. Furthermore, the counter is incremented by M×N−1 with respect to an index value that is at least the (M×N−1)-th difference.

The color reduction counting unit 1107 performs the above-mentioned incrementation processing on a specific number of blocks with a size of 2×2 pixels, and finds a total. For example, when processing is performed on input image data having an image size of 64×64 pixels, there are 32×32 blocks with a size of 2×2 pixels in this input image data. When the above-mentioned incrementation processing is repeatedly applied to each of these 32×32 blocks and a total is found, the result, for example, is the counter 1303 shown in FIG. 13 (an example of a first table). If the targeted data size (compression ratio) is not reached during the first data compression, based on the statistical information shown in the counter 1303, a threshold can be decided on that will allow compression to the targeted data size during data recompression. This will be described in detail below.

The pixel values (color data) for the number of colors constituting one block and the 4-bit pattern flag outputted from the compression units 202 and 252 are written by the DMACs 203 and 253 to memory (memory storage processing). The DMACs change the write positions of the pattern flag, the first color data, and the second, third, and fourth color data. The DMACs specify three addresses, namely, the memory top address for writing the pattern flag, the memory top address for writing the first color data, and the memory top address for writing the second to fourth color data. Specifically, the pattern flags for the blocks are compiled and stored in a pattern flag storage portion of the memory (a memory region used for storing pattern flags). The first color data of the blocks are compiled and stored in a first color storage portion of the memory (a memory region used for storing first color data). The second to fourth color data of the blocks are compiled and stored in second to fourth storage portions of the memory.

Figure 7:
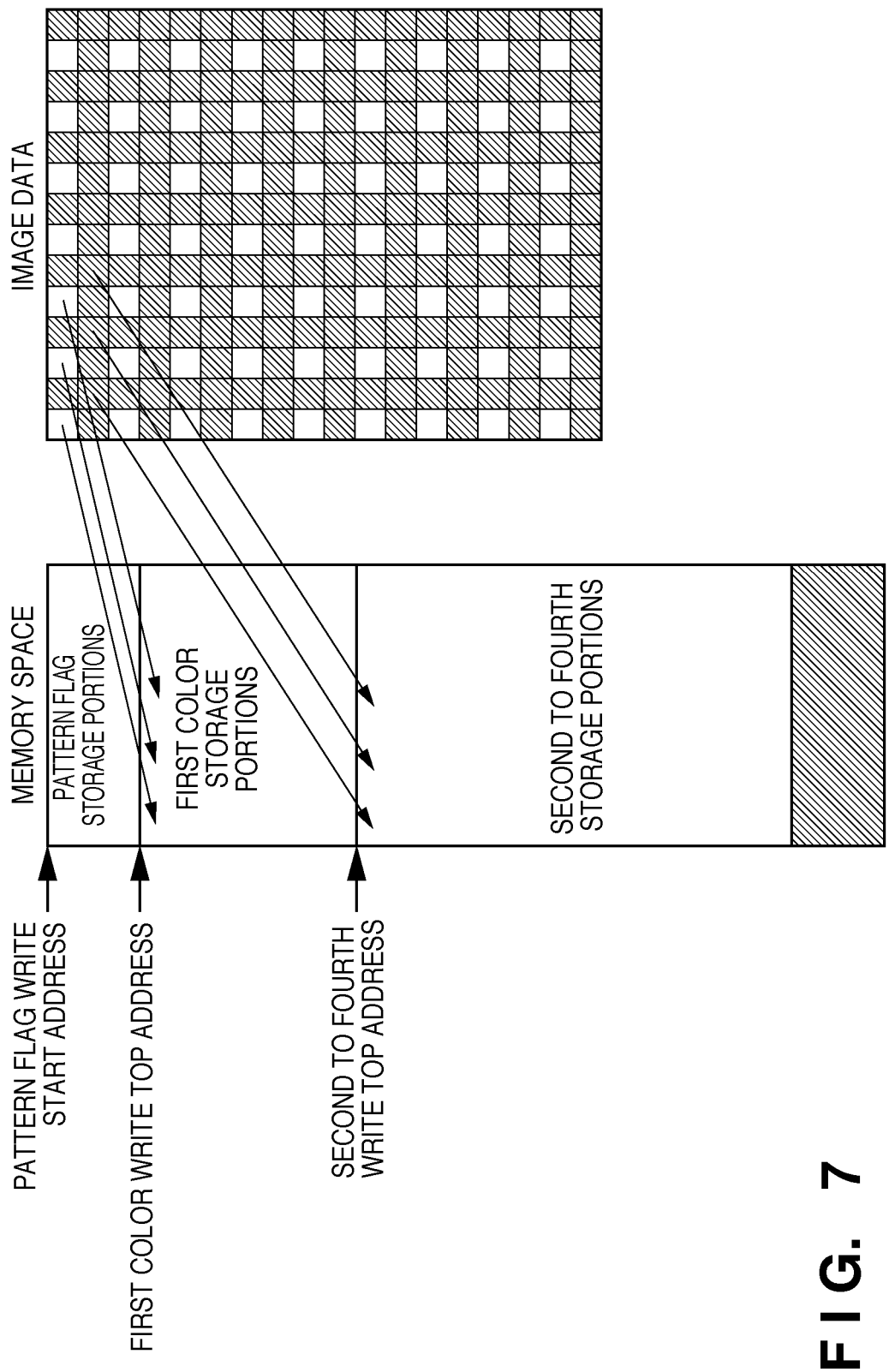
FIG. 7 is a diagram illustrating an example of writing image data to a memory space.

FIG. 7 is a diagram illustrating an example of how a DMAC writes image data to a memory space. When an image of 8 bits of each RGB color with a size of K×L pixels is inputted to a compression unit for each block measuring 2×2 pixels, the data size of the pattern flag storage portion where the data for pattern flags is stored is "(K×L÷2÷2×4÷8) bytes." The data size of the first color storage portion where the data for the first color is stored is "(K×L÷2÷2×24÷8) bytes." The data size of the second to fourth color storage portions where the data for the second color, third color, and fourth color is stored varies according to the raster image to be processed. This is because the number of blocks with second, third, and fourth colors varies from image to image.

In the first color storage portion and the second to fourth color storage portions, the pixel values (color data) are stored in the original number of bits (24 bits in the above-mentioned example) without undergoing compression processing by JPEG encoding or the like. Therefore, when performing, for example, color conversion or gamma correction processing using LUT, color space conversion processing using a matrix operation, or other such color processing that is completed with one pixel input and one pixel output, even if the compressed data is not decoded and returned to the original raster image, it will still be possible to process the corresponding color data in the compressed data. That is, as shown in FIG. 7, it will be possible to directly processing the portion of the corresponding pixel values (color data) with respect to the data stored in the first color storage portion and the second to fourth color storage portions. When image processing in pixel units is performed by the color processor 212 in FIG. 2, color data from the first color write top address and beyond in the memory 106 is read via the DMAC 211, and after processing is executed in pixel units, writing to the memory 106 is performed again. Here, if the image processing generates no change in the number of bits of pixels, rewriting is performed to the same place on the memory 106, so the memory 106 does not end up being used unnecessarily very much. Thus directly using data stored in the memory improves the transfer efficiency through the memory bus, and less color data is processed than the number of pixels of the inputted raster image data (the image data 1201), and as a result the processing is faster. In this embodiment, as shown in FIG. 7, the image data is divided into a pattern flag, a first color, and other second to fourth colors, and these are stored discretely on the memory. Therefore, the raster image data is divided up into blocks of 2×2 pixels in the first color storage portion, and there are shared positions between blocks, such as pixel values for the upper-left pixel of each block (color data) that are continuous over the memory.

In MFP, there are a preview display of scanned image data or stored PDL image data, network transmission, and other such functions. For example, even though the print resolution is 600 dpi, there is usually no need for such a high resolution during preview or transmission, during which 300 dpi or lower is usually adequate. Thus, when there is a need to obtain compressed data, just the color data for the first color stored in the first color storage portion is collectively selected, allowing raster image data of half the size to be acquired simply.

For example, a case of performing the above-mentioned compression and transmission will be described as an example, for when raster image data of 600 dpi is subjected to the above-mentioned compression processing and stored as shown in FIG. 7. If 300 dpi is designated as the resolution for the image to be transmitted, the data stored in the first color storage portion may be selected just as it is. If 400 dpi or another resolution is designated that is higher than the 300 dpi sampled in the first color storage portion, the following processing is carried out. The stored data is first decompressed based on the data stored in the pattern flag storage portion, the first color storage portion, and the second to fourth color storage portions, this is scaled using known scaling processing, and the scaled image is transmitted. If a resolution lower than 300 dpi is designated, just the data in the first color storage portion is used, and scaling processing to the designated resolution is performed. Thus, processing can be performed according to the desired resolution by reading the data while switching according to the required image size.

The data size outputted by compression processing of the input image data to a specific size by the compression units 202 and 252 is dependent on the amount of data stored in the second to fourth color storage portions. The memory size that can be used in storing an image of one page is limited by the system, and there are cases in which a target compression ratio is set in order to obtain data compressed so that it can be stored in that memory size. Accordingly, it is necessary to control the amount of data stored in the second to fourth storage portions by adjusting the threshold with the threshold setting unit 1108 of the color reduction processor 1001. We will now describe a threshold adjustment method for achieving the target compression ratio by re-compression processing based on the counter value of the color reduction counting unit 1107 obtained by compression processing the first time.

Figure 14:
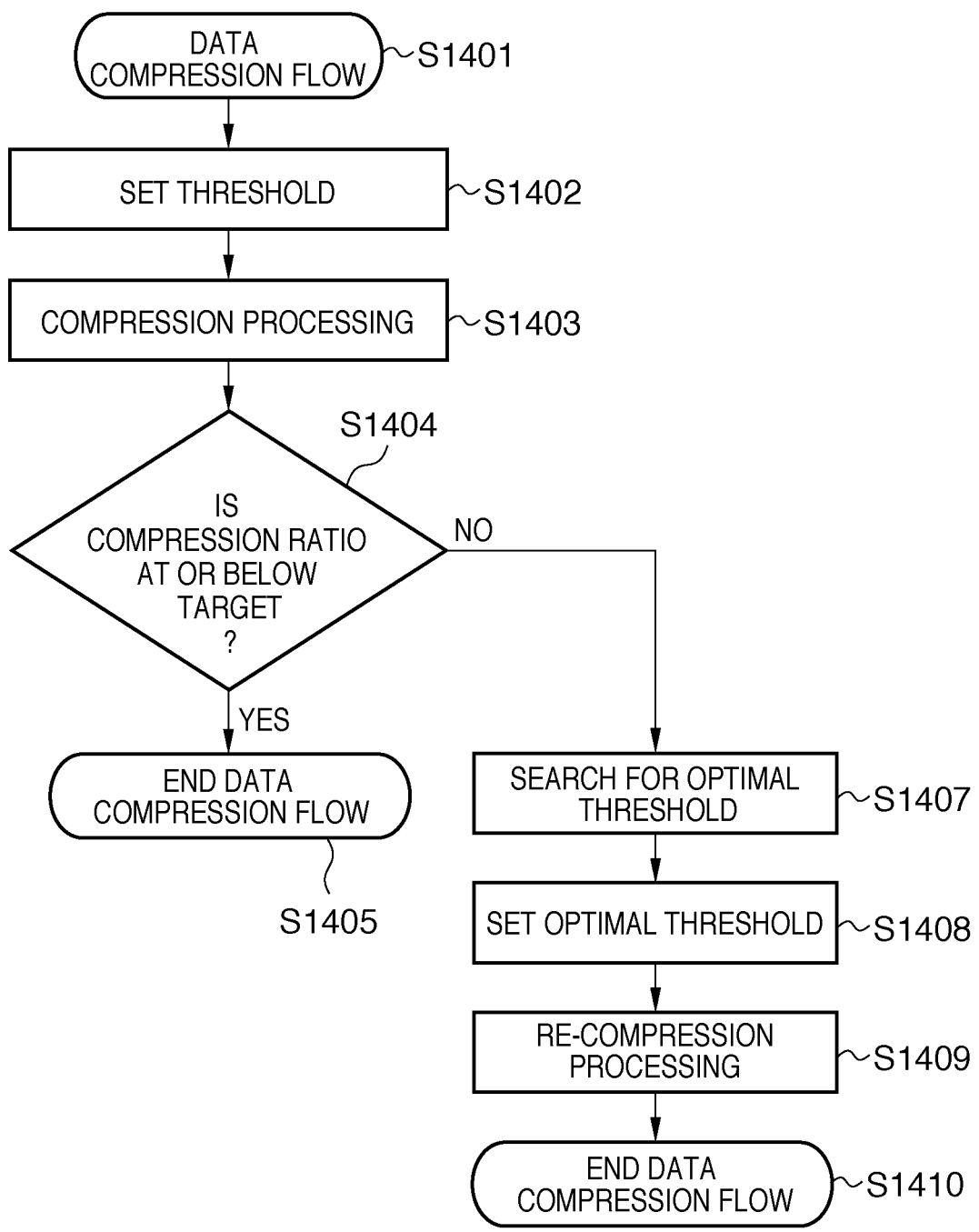
FIG. 14 is a flowchart of the procedure used in threshold adjustment processing.

FIG. 14 is a flowchart of the procedure used in threshold adjustment processing. First, before data compression starts, a threshold for color reduction determination in the color reduction processor 1001 is set at the threshold setting unit 1108 (S1402). During the first compression processing, the threshold is set to "0," and a compression result with no image quality degradation whatsoever with respect to the inputted image is outputted. However, some threshold other than 0 (such as 10) may be set from the outset. In this case, even if a specific image quality degradation should occur in the inputted image, the targeted compression ratio can be attained in the first compression, and this makes it more likely that the compression processing time can be shortened.

Next, the inputted image data is transferred to the compression units 202 and 252 to perform the first compression processing (S1403). Here, the information illustrated in FIG. 13 is stored in the counter of the color reduction counting unit 1107. Upon completion of the first compression, the compression ratio is calculated based on the ratio between the amount of compressed data and the amount of inputted image data, and this is compared with the target compression ratio decided for the system (S1404). If it is determined that the compression ratio during the first compression is at or below the target compression ratio, it is concluded that there is no need to perform re-compression, and this processing is ended (S1405). On the other hand, if it is determined that the compression ratio during the first compression is higher than the target compression ratio, the counter information stored in the color reduction counting unit 1107 is used to decide on the optimal threshold at which the target compression ratio can be achieved (S1407). The larger is the threshold here, the better the compression ratio will be, but the more color reduction there will be and the more the image quality will suffer, so the optimal threshold should be one that is as low as possible while still allowing the target compression ratio to be achieved.

An example of how to decide the optimal threshold in S1407 will be described using a case in which 8 bits of RGB data are inputted for 32×32 blocks (an image with a 64×64 pixel size), and the value of the counter 1303 in FIG. 13 is thereby acquired. The size of the inputted image data for the 8-bit data (24 bits color) for each of the RGB colors of the 32×32 blocks is 32×32×4×24÷8=12,288. When this inputted image data is compressed with a threshold of "0" set, it can be seen that the color reduction number for the entire image is 777 colors, as indicated by the counter 1303. Accordingly, the number of colors written to the memory in the first compression is 32×32×4−777=3319. Consequently, the total size of the data stored in the first color storage portion and the second to fourth storage portions is 3319×24÷8=9957 bytes. Meanwhile, as mentioned above, the compressed data also includes the pattern flag storage amount. The data size of the pattern flags is 32×32×4÷8=512 bytes. If we use this information to calculate the compression ratio in the first compression, we see that (9957+512)÷12,288×100=85.2%. If we assume here that the target compression ratio is set to 40%, then the compression ratio in the first compression is higher than the target compression ratio, so re-compression is necessary. In view of this, the counter 1303 is used to decide on a threshold large enough to attain the target compression ratio in re-compression.

The data size that needs to be reduced in order to attain the target compression ratio is 12,288×(1−0.4)=7373 (rounding up anything below the decimal point). After compression, however, 512 bytes of data are added for pattern flags, so the total amount the color data needs to be reduced is 7373+512=7885 bytes. When one-color reduction is performed in a block of 2×2 pixels, 3 bytes of data can be reduced with 8-bit RGB data. In view of this, the color reduction number needed for a reduction of 7885 bytes in the entire image with a size of 64×64 pixels is 7885÷3=2629 colors (rounding up anything below the decimal point). The information of the counter 1303 is used to search for the threshold at which 2629 colors can be reduced at least in one entire page, starting with the lowest index value, whereupon it can be seen that a total of 2630 colors can be reduced from a page using a threshold of "70."

The threshold "70" found in this manner is set as the optimal threshold at the threshold setting unit 1108 (S1408). If the same inputted image data is used to perform re-compression processing (S1409), the target compression ratio can always been attained by a single instance of re-compression processing. Consequently, there is no need to calculate the compression ratio for the outputted image data size after re-compression processing, or re-re-compression processing, which means that the compression processing will take less time.

Next, the decompression units 222 and 232 will be described. With the decompression units 222 and 232, as discussed above, the pattern flags and color data generated and stored by the compression unit 202 or 252 are subjected to processing in which they are returned to raster image data. The DMACs 221 and 231 specify three addresses, namely, the memory top address for writing the pattern flag, the memory top address for writing the first color data, and the memory top address for writing the second to fourth color data, to the memory 106 as shown in FIG. 7. The DMACs 221 and 231 read the data from these three addresses, and transfer the data to the decompression units 222 and 232.

The decompression units 222 and 232 first interpret the 4-bit pattern flag and acquire the number of colors in that block. In addition to first color data, second, third, and fourth color data are read according to the number of colors, and the color data for the first color and the second to fourth colors are rearranged according to the layout patterns (shown in FIG. 4) for the color data predefined for each of the pattern flags. Doing this allows a block of 2×2 pixels to be decompressed and decoded.

Also, when the image size is reduced by half by the decompression units 222 and 232, as discussed above, there is no need for pattern flags or second to fourth color data, so only the first color write top address is specified by the DMACs 221 and 231. Consequently, only the first color data is read from the first color storage portion of the memory 106, and this is what constitutes the image data. Processing in this way allows the memory bus band to be used more efficiently.

As discussed above, the time it takes for compression processing can be shortened by performing optimal threshold setting at the color reduction processor 1001 during re-compression based on the information in the counter 1303 of the color reduction counting unit 1107 stored during the first compression. Also, this prevents unnecessary image quality degradation that would be caused by setting the threshold too high for the sake of increasing the compression ratio.

In this embodiment, the pattern flags and the patterns indicating the layout of the color data were associated as shown in FIG. 4, but this is not the only option. For example, the pattern flags and the patterns indicating the layout of the color data may be associated and defined so that the pixel value of the lower-right pixel in a block of 2×2 pixels is the first color. Also, in this embodiment the size of one block is 2×2 pixels, but one block may consist of another number of pixels. Also, in compression, the inputted image data is RGB 8 bits, but may instead be data for a different color space (such as a CMYK color space), grayscale data, or data having a pixel value other than 8 bits.

Also, a compression method involving color reduction is used as an example in this embodiment, and another known color reduction process may be used instead. For example, another known method for obtaining color difference can be used.

Also, with the color reduction counting unit 1107 in the above embodiment, the table of the counter 1301 in FIG. 13 was generated by providing a counter that is an indicator indicating the amount of data being reduced, with respect to each of the plurality of index values (threshold indexes) that are indicators indicating the thresholds that can be set. Specifically, in the above embodiment, the counter was increased by focusing on the amount of data to be reduced with respect to each index value, but the present invention is not limited to this, and the counter may instead be increased by focusing on the amount of data remaining with respect to each index value. In this case, however, in deciding the optimal threshold at which the target compression ratio can be attained in S1407, the calculations are made using as a reference the amount of data (the number of colors) to remain. For example, when a block of 2×2 pixels such as the image data 1201 in FIG. 12 is inputted, the "120," "50," and "10" of the differences 1208 to 1210 are inputted to the color reduction counting unit 1107, so in the counter table, the counter is increased by 4 with respect to an index value less than the three-color difference (the difference 1210) for a block, is increased by 3 with respect to an index value that is at least the three-color difference (the difference 1210) and less than the two-color difference (the difference 1209) for a block, is increased by 2 with respect to an index value that is at least the two-color difference (the difference 1209) and less than the one-color difference (the difference 1208), and is increased by 1 with respect to an index value that is at least the one-color difference (the difference 1208). Since the data size with an image of 64×64 pixels is 12,288 bytes as mentioned above, when the target compression ratio is set to 40%, the target data size after compression processing is 12,288×0.4=4915 bytes. Also, since the amount of data for the pattern flags after compression is 512 bytes, the amount of data for the color data after compression may be at or under 4915−512=4403, that is, the remaining color data may be at or under the amount of data for 1467 colors. If we search for index values at which the counter indicates 1467 or less, starting with the lowest index value, it can be seen that the threshold may be set to "70" just as in the embodiment discussed above. In other words, a range at or below a threshold of 70 is at or below the amount of data for 1467 colors.

Second Embodiment

With the compression processing described in the first embodiment, the size of the compressed data stored in the memory after compression processing depends on the size of the raster image data that is inputted. Accordingly, it is impossible to crop out and process just part of an image, for example, among the compressed data. In this embodiment, as will be discussed below, the raster image data is compressed in tile units, and the resulting compressed data is then stored in the memory. As a result, part of the image constituted by the raster image data can be cropped and processed in tile units, and this makes random access of the memory easier.

Figure 8:
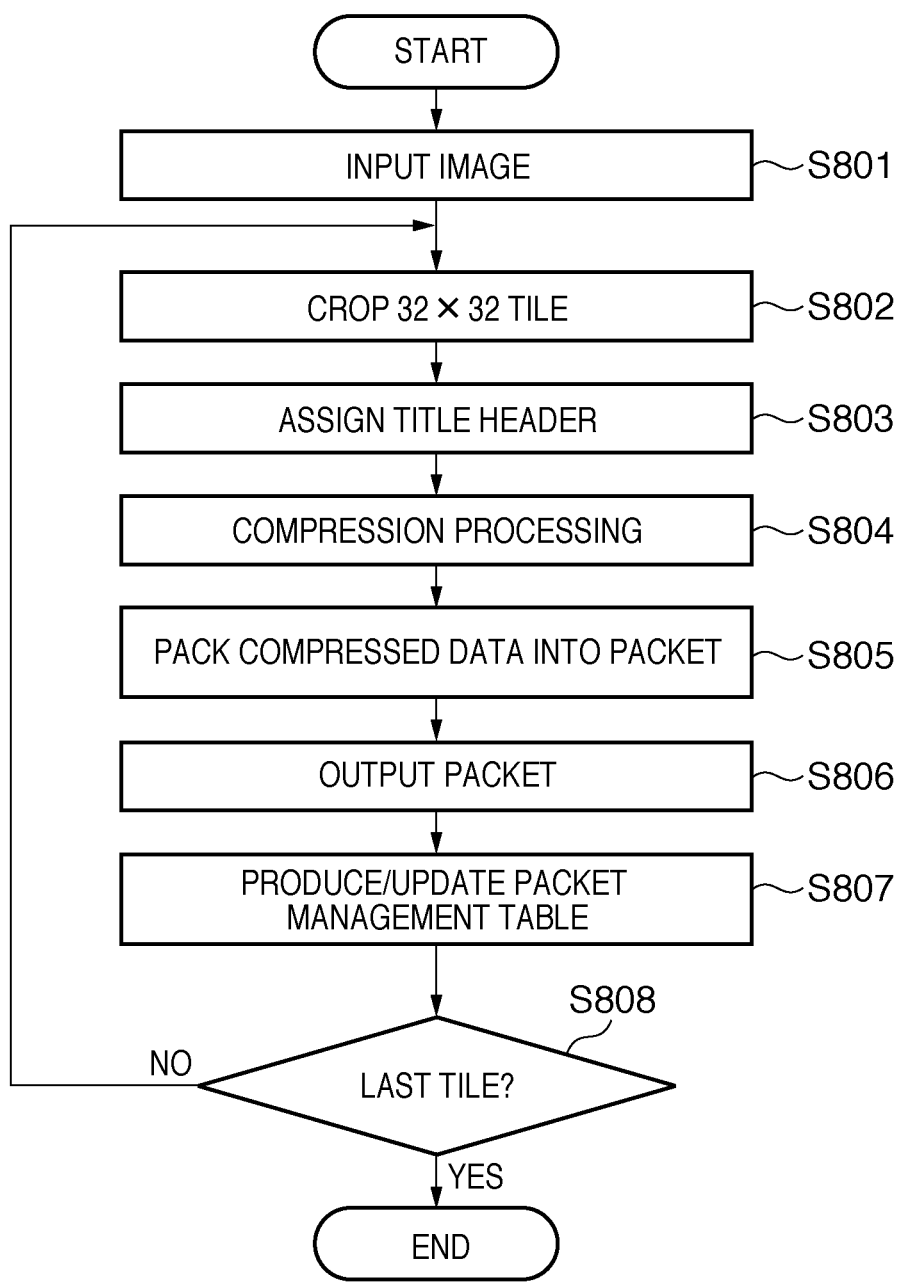
FIG. 8 is a flowchart of the procedure used in compression processing in a second embodiment.

FIG. 8 is a flowchart of the procedure used in compression processing in this embodiment. First, raster image data is inputted for each page (S801). Then, the inputted image data is divided into block units of a specific size, each one of which is processed individually (S802). In this embodiment, one block consists of 64×64 pixels. Hereinafter a block of 64×64 pixels will be called a "tile" in order to distinguish it from the block of 2×2 pixels in the first embodiment. FIG. 15 shows the relation between tiles and blocks. When an inputted page image is divided into tile units (tile division), the positions of the tiles within the page are expressed as tile coordinates (X, Y). If the size of each tile is 64×64, then there are 32×32 blocks of 2×2 pixels in each tile.

Each tile is assigned header information (tile header) of a specific, fixed length (S803). FIG. 16 shows the header information assigned to a tile after compression. The assigned header includes a page ID, tile coordinates, a color space, the number of bits of pixel data, the data size of the tile, whether or not there is attribute information, a compression flag, and so forth.

The page ID is a unique ID number for each page. The tile coordinates indicate the position of a tile in the raster image data for a page. For example, they may be two-dimensional coordinates in an X-Y grid. The color space is given as an identifier that indicates whether the tile is RGB image data, or CMYK image data, or grayscale image data. The number of bits of image data is the bit length per pixel in a tile. The data size is given in byte units for the first color data size and data size of the second to fourth colors for the tile. Whether or not there is attribute information is indicated by whether or not attribute information (text or photograph) has been assigned in pixel units to that image data. The compression flag indicates whether the tile includes compressed data, or whether it includes uncompressed data.

Next, the compression processing described in the first embodiment is performed in these tile units (S804). The compressed tile image data are compiled as a single set of data (S805). The data structure thus compiled is shown in FIG. 16 (an example of second storage). A unit of data including a header as shown in FIG. 16 will hereinafter be referred to as a packet. Once compression processing in tile units is finished and the data size has been established, the data is compiled in the packet shown in FIG. 16 in a state of filling the space between the first color storage portion and the second to fourth storage portions. The packet is outputted through a DMAC to the memory (S806).

Figures 17, 18:
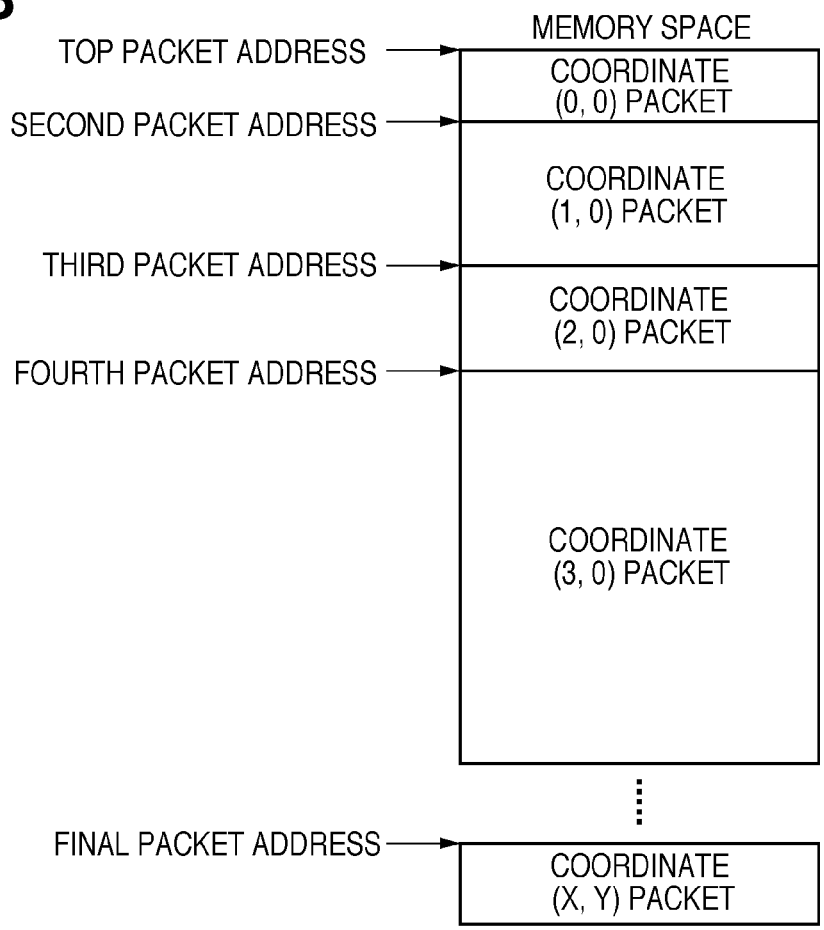
FIG. 17 is a diagram illustrating an example of a packet management table in a second embodiment.
FIG. 18 is a diagram illustrating show a packet is stored in memory in a second embodiment.

Next, a list of the packet coordinates and sizes is made, and a packet management table is generated (S807). When a packet is generated for the second and subsequent tiles, the packet management table is updated based on the coordinates and size of that packet. FIG. 17 is a diagram illustrating an example of the packet management table.

A decision is made as to whether or not all of the tiles that are to be processed have undergone the above-mentioned processing, and this processing is repeated until the last tile of the raster image data in a page unit (S808).

In this embodiment, since the image is written to the memory in tile units, as shown in FIG. 18, the size varies from one packet to the next, and the top address skips around for the packets. However, using the packet management table generated and updated in S807 allows the top address of the packet at any coordinates to be searched for. If the write address of the top packet is known, the top address of any packet can be found by using as an offset the packet size listed in the packet management table. For example, let us consider a case of reading the third packet in FIG. 18. In this case, the combined size of the first and second packets is found from the packet management table shown in FIG. 17, the third packet address is calculated from the offset with respect to the address of the top packet, and the data is read. As a result, the data for the third packet can be acquired. As discussed above, in this embodiment any image data compressed in tile units can be accessed, so the partial processing of an image can be easily carried out.

Also, the contents of the color reduction processor 1001 may be partially changed as shown in FIG. 19, and an internal SRAM may be provided, which affords higher speed by having color reduction reprocessing carried out with hardware. That is, the necessary color reduction number is preset in a color reduction number counting unit 1901 in order to achieve the target compression ratio in tile units. For example, when compression processing of an inputted image of RGB 8 bits each is performed in tile data units of 64×64 pixels, the inputted image data is 64×64×8×3÷8=12,288 bytes. If the target compression ratio here is 40%, then as described in the first embodiment, it is found ahead of time by calculation that the number of colors to be reduced is a total of 2629 colors. Therefore, this value is set in a target color reduction number setting unit 1904, and an initial threshold of "0" is set in the threshold setting unit 1108, whereupon compression processing is commenced. The first tile data is then transferred to an input data storage SRAM 1902, and the color reduction processing result at the threshold of "0" is stored in an output data storage SRAM 1903. When all of the image data for one tile is outputted from the data selection output unit 1109 to the output data storage SRAM 1903, the data selection output unit 1109 notifies the color reduction number counting unit 1901 with an end signal. Upon receiving a compression processing end signal, the color reduction number counting unit 1901 compares the target color reduction numbers set in the target color reduction number setting unit 1904 with the value of the counter 1303 stored internally, starting with the lowest index value first. The index value with the highest counter 1303 is searched for among the target color reduction numbers. For instance, if "2629" has been set in the target color reduction number setting unit 1904, when this is compared to the counter 1303 in FIG. 13, an index value of "70" is searched for.

The color reduction number counting unit 1901 sets this value in the threshold setting unit 1108. The threshold setting unit 1108 temporarily shunts the initially set threshold of "0" to an internal buffer, sets "70" as the optimal threshold, and directs the color reduction processor 1001 to perform reprocessing. Upon being directed to perform reprocessing, the color reduction processor 1001 again reduces the same inputted image data from the input data storage SRAM 1902. Here, the processing is done at the threshold set to "70." When all of the image data for one tile is outputted from the data selection output unit 1109 to the output data storage SRAM 1903, the output data is outputted from the output data storage SRAM 1903 to a subsequent level. Also, the data selection output unit 1109 notifies the color reduction number counting unit 1901 again with an end signal. Upon receiving a compression processing end signal, the color reduction number counting unit 1901 returns the threshold setting to the threshold of "0" initially set and shunted to the internal buffer, and the processing of the next tile image data is performed.

Thus performing processing on the tile image data for an entire page allows the acquisition of packet data in a data amount that is at or under all the target compression ratios.

When decompression processing is performed, a header is assigned in packet units, so the decompression processing is performed by using the information given in that header. First, when the compression flag in the header indicates non-compression, data excluding the header is outputted. On the other hand, if compression is indicated, decompression processing is performed. In this decompression processing, the pattern flag storage position, first color data storage position, and second to fourth color storage positions are found from the information given in the header, and are decompressed in that order to tile image data. For example, the position of a pattern flag is found from the offset, since the header has a fixed length. If the size of the tile image data is 64×64 pixels, the size of the pattern flag is fixed at 32×32×4 bits, so the first color data is found from the amount of offset from the pattern flag position. Since the first-color data is not of a fixed length, the data for the second, third, and fourth colors is found from the offset from the first-color data position, by referring to the first-color size in the header.

As discussed above, just part of image data can be cropped out in tile units and processed, and this makes random access of the compressed data easier.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-159164, filed Jul. 13, 2010, which is hereby incorporated by reference herein in its entirety.

What is claimed is:

1. A compression method comprising:
an input step of inputting image data;
a division step of dividing the image data inputted by the input unit into blocks, wherein each of the blocks has M×N pixels (where M and N are integers greater than or equal to 2);
a color reduction step of performing first color reduction on each of the blocks to generate (M×N−1) reduced-color blocks with reduced-color block K, where $1 \leq K < (M \times N-1)$, having K different colors in a case where the each of the blocks has M×N colors;
an acquisition step of acquiring differences between pixel values for each of the reduced-color blocks generated from said each of the blocks and pixel values for said each of the blocks before the first color reduction, wherein the differences are acquired for each and every one of the (M×N−1) reduced-color blocks;
a generation step of generating a first table in which a plurality of thresholds are associated with either amount of data to be reduced in the image data or amount of data to be remained in the image data, based on the differences acquired by the acquisition unit for each of the blocks in the image data, wherein the plurality of thresholds are indexes for indicating pixel values of one block for compression;
a specifying step of specifying a threshold at which an amount of data after compression of the image data is equal to or less than a target data amount, based on the first table; and
a compression step of performing second color reduction of the number of colors of each of the blocks based on the threshold specified in the specifying step, and generating compressed data by the second color reduction.

2. An image processing apparatus comprising:
at least a processor coupled to memory, the processor and memory cooperating to serve as:
an input unit configured to input image data;
a division unit configured to divide the image data inputted by the input unit into blocks, wherein each of the blocks has M×N pixels (where M and N are integers greater than or equal to 2);
a color-reduction unit configured to perform first color reduction on each of the blocks to generate (M×N−1) reduced-color blocks with reduced-color block K, where $1 \leq K < (M \times N-1)$, having K different colors in a case where the each of the blocks has M×N colors;
an acquisition unit configured to acquire differences between pixel values for each of the reduced-color blocks generated from said each of the blocks and pixel values for said each of the blocks before the first color reduction, wherein the differences are acquired for each and every one of the (M×N−1) reduced-color blocks;
a generation unit configured to generate a first table in which a plurality of thresholds are associated with either amount of data to be reduced in the image data or amount of data to be remained in the image data, based on the differences acquired by the acquisition unit for each of the blocks in the image data, wherein the plurality of thresholds are indexes for indicating pixel values of one block for compression;
a specifying unit configured to specify a threshold at which an amount of data after compression of the image data is equal to or less than a target data amount, based on the first table; and
a compression unit configured to perform second color reduction of the number of colors of each of the blocks based on the threshold specified by the specifying unit, and to generate compressed data by the second color reduction.

3. The image processing apparatus according to claim 2, wherein the memory stores the compressed data generated by the compression unit.

4. The image processing apparatus according to claim 2, wherein the compression unit, based on color data for each pixel in each of the blocks after the second color reduction based on the specified threshold, generates, as the compressed data, a pattern flag indicating a layout pattern for color data included in each of the blocks after the second color reduction, and color data for numbers of colors included in each of the blocks after the second color reduction.

5. The image processing apparatus according to claim 4, further comprising a second table in which the pattern flag is associated with the layout pattern laid out within each of the block,
wherein the compression unit specifies a pattern flag indicating the layout pattern for color data included in each of the blocks after the second color reduction based on the second table, in which the pattern flag is associated with the layout pattern laid out within each of the blocks, and the color data for each pixel in each of the blocks after the second color reduction, and generates, as the compressed data, the color data for numbers of colors included in each of the blocks after the second color reduction and the specified pattern flag.

6. The image processing apparatus according to claim 5,
wherein the compression unit, based on the color data for each pixel in each of the blocks after the second color reduction, specifies the pattern flag indicating the layout pattern of the color data included in each of the blocks after the second color reduction,
selects color data corresponding to a pixel at a pre-determined position of each of the blocks after the second color reduction as color data of a first color,
selects color data of a second or subsequent color corresponding to the layout pattern defined by the specified pattern flag in a case where there are two or more colors included in each of the blocks after the second color reduction, and
generates as the compressed data, the specified pattern flag, the first color data, and the second or subsequent color data.

7. The image processing apparatus according to claim 6,
wherein, in a case where each of the blocks is a block of 2×2 pixels, a pixel at the pre-determined position is either a upper-left pixel or a lower-right pixel in each of the blocks.

8. The image processing apparatus according to claim 2,
wherein, in a case where the first table is such that the plurality of thresholds are associated with the amount of data to be reduced,
the generation unit generates the first table by successively processing each of the blocks divided by the division unit,
for each of the blocks,
not increasing a counter corresponding to a threshold less than a first difference when the first color reduction is for reducing the number of colors from (M×N) colors to (M×N−1) colors,
increasing, by K (where K=1, 2, . . . M×N−2), a counter corresponding to a threshold that is at least a K-th difference when the first color reduction is for reducing the number of colors from (M×N) colors to (M×N−K) colors and less than a (K+1)-th difference when the first color reduction is for reducing the number of colors from (M×N) colors to (M×N−K−1) colors, and
increasing, by (M×N−1), a counter corresponding to a threshold that is at least an (M×N−1)-th difference when the first color reduction is for reducing the number of colors from (M×N) colors to one color.

9. The image processing apparatus according to claim 2,
wherein, in a case where the first table is such that the plurality of thresholds are associated with the amount of data to be remained,
the generation unit generates the first table by successively processing each of the blocks divided by the division unit,
for each of the blocks,
increasing, by (M×N), a counter corresponding to a threshold less than a first difference when the first color reduction is for reducing the number of colors from (M×N) colors to (M×N−1) colors,
increasing, by (M×N−K), (where K=1, 2, . . . M×N−2) a counter corresponding to a threshold that is at least a K-th difference when the first color reduction is for reducing the number of colors from (M×N) colors to (M×N−K) colors and less than a (K+1)-th difference when the first color reduction is from (M×N) colors to (M×N−K−1) colors, and
increasing, by 1, a counter corresponding to a threshold that is at least an (M×N−1)-th difference when the first color reduction is for reducing the number of colors from (M×N) colors to one color.

10. The image processing apparatus according to claim 2,
wherein the processor and memory further cooperate to serve as a tile division unit for dividing the image data inputted by the input unit into tiles, and
wherein the division unit further divides the image data divided into the tiles by the tile division unit into the blocks.

11. A non-transitory computer-readable storage medium that stores programs for causing a computer to function as:
a division unit configured to divide image data into blocks, wherein each of the blocks has M×N pixels (where M and N are integers greater than or equal to 2);
a color-reduction unit configured to perform first color reduction on each of the blocks to generate (M×N−1) reduced-color blocks with reduced-color block K, where 1≤K<(M×N−1), having K different colors in a case where the each of the blocks has M×N colors;
an acquisition unit configured to acquire differences between pixel values for each of the reduced-color blocks generated from said each of the blocks and pixel values for said each of the blocks before the first color reduction, wherein the differences are acquired for each and every one of the (M×N−1) reduced-color blocks;
a generation unit configured to generate a first table in which a plurality of thresholds are associated with either the amount of data to be reduced in the image data or amount of data to be remained in the image data, based on the differences acquired by the acquisition unit for each of the blocks in the image data, wherein the plurality of thresholds are indexes for indicating pixel values of one block for compression;
a specifying unit configured to specify a threshold at which an amount of data after compression of the image data is equal to or less than a target data amount, based on the first table; and
a compression unit configured to perform second color reduction of the number of colors of each of the blocks based on the threshold specified by the specifying unit, and to generate compressed data by the second color reduction.

* * * * *